United States Patent
Kiyokami et al.

(10) Patent No.: US 12,065,273 B2
(45) Date of Patent: Aug. 20, 2024

(54) TAKEOFF/LANDING ASSIST DEVICE

(71) Applicant: TOYOTA JIDOSHA KABUSHIKI KAISHA, Toyota (JP)

(72) Inventors: Hiroaki Kiyokami, Nisshin (JP); Masao Tajima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 63 days.

(21) Appl. No.: 18/085,821

(22) Filed: Dec. 21, 2022

(65) Prior Publication Data
US 2023/0202691 A1   Jun. 29, 2023

(30) Foreign Application Priority Data
Dec. 24, 2021   (JP) .................................. 2021-211518

(51) Int. Cl.
*B64U 70/99*   (2023.01)
*B64C 39/02*   (2023.01)
*B64F 1/22*   (2006.01)

(52) U.S. Cl.
CPC ............ *B64U 70/99* (2023.01); *B64C 39/024* (2013.01); *B64F 1/22* (2013.01)

(58) Field of Classification Search
CPC .... B64U 70/99; B64U 2101/64; B64U 50/37; B64U 70/92; B64U 70/93; B64U 80/86; B64U 10/13; B64C 39/024; B64F 1/22
See application file for complete search history.

(56) References Cited

U.S. PATENT DOCUMENTS

| | | | | |
|---|---|---|---|---|
| 10,287,033 B2 * | 5/2019 | Hu | ........................ | H02N 15/00 |
| 10,899,436 B2 * | 1/2021 | Gentry | ................... | B64U 60/40 |
| 11,597,515 B2 * | 3/2023 | Passley | ................. | B64U 50/35 |
| 11,603,218 B2 * | 3/2023 | Fisher | ..................... | B64C 29/02 |
| 11,603,219 B2 * | 3/2023 | Ratajczak | ................ | B64D 1/22 |
| 11,636,771 B2 * | 4/2023 | Barker | .................. | B64C 39/024 |
| | | | | 701/16 |

(Continued)

FOREIGN PATENT DOCUMENTS

| | | |
|---|---|---|
| CN | 212827924 U | 3/2021 |
| JP | 2019-097271 A | 6/2019 |
| JP | 2021-084621 A | 6/2021 |

OTHER PUBLICATIONS

"Long-waited First Appearance of DJI Dock. Perfectionism Felt in Every Detail: Day 01 [DJI Air Works 2022]", Drone explore the future, https://www.drone.jp/special/20221011144463758488.html?fbclid=lwAR3agCf4T24liywdZimQ-lqnhlxCpvrFoodP4ulSXKKQ6_Hw86e-uR1s00k), Oct. 11, 2022.

(Continued)

*Primary Examiner* — Medhat Badawi
(74) *Attorney, Agent, or Firm* — Dinsmore & Shohl LLP

(57) ABSTRACT

A position correcting mechanism sandwiches, from both sides, a horizontal leg portion of a flying vehicle that has landed on a takeoff/landing surface of a stage, and moves the flying vehicle on the takeoff/landing surface to a position along a centerline. A grip mechanism grips a supporting leg portion of the flying vehicle. The flying vehicle is moved toward a securing device provided at an edge part of the stage, and an end portion of the horizontal leg portion is inserted into an insertion hole of an insertion part. The flying vehicle is thereby secured on the takeoff/landing surface.

19 Claims, 16 Drawing Sheets

(56) References Cited

U.S. PATENT DOCUMENTS

| | | | | |
|---|---|---|---|---|
| 11,667,402 B2* | 6/2023 | Liske | B64F 1/322 | |
| | | | 244/116 | |
| 11,673,690 B2* | 6/2023 | Dayan | B64U 10/60 | |
| | | | 244/114 R | |
| 11,713,136 B2* | 8/2023 | Foggia | B64U 70/92 | |
| | | | 244/114 R | |
| 11,714,189 B2* | 8/2023 | Padmanabhan | G01S 13/9027 | |
| | | | 342/22 | |
| 11,738,867 B2* | 8/2023 | Ehasoo | B60L 5/38 | |
| | | | 244/17.11 | |
| 11,748,688 B2* | 9/2023 | Ur | B64C 39/024 | |
| | | | 705/332 | |
| 11,760,485 B2* | 9/2023 | Wabnegger | G01R 31/085 | |
| | | | 244/121 | |
| 11,767,129 B2* | 9/2023 | Warwick | B64F 1/007 | |
| | | | 244/137.1 | |
| 11,772,814 B2* | 10/2023 | Dubois | B64D 17/62 | |
| | | | 244/110 E | |
| 11,780,606 B2* | 10/2023 | Carthew | B64U 70/99 | |
| | | | 244/114 R | |
| 11,794,894 B2* | 10/2023 | Brock | B64U 70/95 | |
| 11,814,191 B2* | 11/2023 | Cheng | B64F 1/36 | |
| 11,814,241 B2* | 11/2023 | Tian | B65D 90/14 | |
| 11,840,152 B2* | 12/2023 | Fisher | G08G 5/0039 | |
| 11,851,209 B2* | 12/2023 | Fisher | B64C 39/024 | |
| 11,858,662 B2* | 1/2024 | Gil | B64F 1/04 | |
| 11,866,168 B2* | 1/2024 | Cooper | B64F 1/222 | |
| 11,884,422 B2* | 1/2024 | Lowe | H05K 7/20154 | |
| 11,898,368 B2* | 2/2024 | Blake | E04H 6/44 | |
| 11,900,823 B2* | 2/2024 | Surace | G05D 1/0676 | |
| 11,932,315 B2* | 3/2024 | Hwang | B64F 1/32 | |
| 11,939,057 B2* | 3/2024 | Hamm | B64U 50/38 | |
| 11,939,080 B2* | 3/2024 | Cowden | B64U 80/30 | |
| 11,939,083 B2* | 3/2024 | Baklycki | B64F 1/36 | |
| 2014/0124621 A1* | 5/2014 | Godzdanker | B64F 1/12 | |
| | | | 244/110 E | |
| 2014/0319272 A1* | 10/2014 | Casado | B64U 80/25 | |
| | | | 244/110 E | |
| 2017/0137118 A1* | 5/2017 | Gentry | B64U 60/40 | |
| 2019/0009926 A1* | 1/2019 | Hu | B64F 1/02 | |
| 2019/0152326 A1* | 5/2019 | Nishikawa | B64U 50/19 | |
| 2019/0161190 A1* | 5/2019 | Gil | B64U 10/16 | |
| 2020/0207484 A1* | 7/2020 | Foggia | B64F 1/36 | |
| 2020/0346736 A1* | 11/2020 | Krasnoff | B64C 3/56 | |
| 2020/0346743 A1* | 11/2020 | Bernard | B64U 60/50 | |
| 2022/0171388 A1* | 6/2022 | Yanagihashi | B65G 43/00 | |
| 2023/0140387 A1* | 5/2023 | Infanti | B64C 25/62 | |
| | | | 244/114 R | |
| 2023/0202682 A1* | 6/2023 | Kiyokami | B64U 80/86 | |
| | | | 244/114 R | |
| 2023/0202691 A1* | 6/2023 | Kiyokami | B64C 39/024 | |
| | | | 244/114 R | |
| 2023/0373626 A1* | 11/2023 | Kiyokami | B64D 1/22 | |
| 2023/0399132 A1* | 12/2023 | Kiyokami | B64U 70/00 | |

OTHER PUBLICATIONS

VFR "Take Off Anywhere Project Announces Domestically Produced Drone Port" for producing drones for happiness of people in the 100-year-life era, PR Times, https://prtimes.jp/main/html/rd/p/000000010.000057522.html?fbclid=IwAROCV1YslPc200E4tmesa_eWWiunrQGuzsFGaUGQfyr25wtVQ0KUusfhPWU), Feb. 9, 2022.

* cited by examiner

TAKEOFF/LANDING ASSIST DEVICE

CROSS REFERENCE TO RELATED APPLICATION

This application claims priority to Japanese Patent Application No. 2021-211518 filed on Dec. 24, 2021, which is incorporated herein by reference in its entirety including the specification, claims, drawings, and abstract.

TECHNICAL FIELD

The present disclosure relates to a device for assisting takeoff and landing of a flying vehicle.

BACKGROUND

Flying vehicles such as drones and unmanned aerial vehicles (UAVs) are known.

JP 2021-84621A discloses a power feed station comprising a landing stage having a power feed area provided thereon. A flying vehicle that has landed on the landing stage is moved on the landing stage to the power feed area by a means for moving the flying vehicle, and is fed power in the power feed area.

In a takeoff/landing assist device (such as a drone port) having a stage on which a flying vehicle is to perform takeoff and landing, there are cases where a work operation (such as cargo handling) using the flying vehicle, power feed to the flying vehicle, replacement of parts of the flying vehicle, storage of the flying vehicle, and the like are carried out on the stage. In order to carry out these operations in a stable state, it is desirable to secure the flying vehicle on the stage so as to prevent shifting of the position of the flying vehicle or instability of the attitude of the flying vehicle on the stage.

An object of the present disclosure is, in a takeoff/landing assist device having a stage on which a flying vehicle is to perform takeoff and landing, to secure the flying vehicle on the stage.

SUMMARY

One embodiment of the present disclosure is a takeoff/landing assist device including: a stage on which a flying vehicle is to perform takeoff and landing; a securing device provided at an edge part of the stage and configured to secure the flying vehicle on the stage; and a moving mechanism configured to move the flying vehicle, which has landed on the stage at an inward part located inward from the edge part, from the inward part to the securing device. The securing device secures to the securing device the flying vehicle that has been moved by the moving mechanism.

According to the above configuration, a flying vehicle that has landed on the stage is moved to the edge part of the stage, and is secured by the securing device provided at that edge part. In this way, the flying vehicle can be secured on the stage. While the flying vehicle is in the state of being secured by the securing device, cargo handling using the flying vehicle, charging of the battery of the flying vehicle, replacement of parts of the flying vehicle, storage of the flying vehicle, and the like may be carried out. Since the flying vehicle is secured by the securing device, even when a load generated due to such operations is applied to the flying vehicle, it is possible to prevent position shift, unbalanced attitude, and the like of the flying vehicle which may otherwise result therefrom. Further, since the securing device is provided at the edge part of the stage, the space of the stage can be utilized effectively as compared to a case where the securing device is provided at or near the center of the stage.

The securing device may have formed therein an insertion hole into which a leg of the flying vehicle is inserted. The securing device may secure the flying vehicle on the stage by having the leg inserted in the insertion hole. The moving mechanism may cause the leg to be inserted into the insertion hole by moving the flying vehicle, which has landed on the stage at the inward part located inward from the edge part, from the inward part to the securing device.

According to the above configuration, the flying vehicle can be secured on the stage by having the leg of the flying vehicle inserted in the insertion hole formed in the securing device. This arrangement is only one example, and the flying vehicle may be secured on the stage by a different configuration. For example, the flying vehicle may be secured on the stage by having the leg sandwiched from the front and rear directions.

A contact that is electrically connectable to the leg inserted in the insertion hole may be provided inside the insertion hole.

According to the above-described arrangement, a battery of the flying vehicle can be charged while the flying vehicle is in a state of being secured by the securing device. Since the flying vehicle can be charged in this manner via the securing device, there is no need to separately provide a power feed station or the like at a different site.

The insertion hole may be formed at two locations in the securing device. A positive contact may be provided inside the insertion hole formed at one of the two locations, and a negative contact may be provided inside the insertion hole formed at the other of the two locations.

According to the above configuration, it is possible to prevent occurrence of situations which may arise in cases where positive and negative contacts are formed in the same insertion hole. For example, even when foreign matter enters into an insertion hole, short circuit can be avoided.

The takeoff/landing assist device may further include a lid for closing an opening of the insertion hole. The lid may open the opening when the leg is inserted into the insertion hole, and may close the opening when the leg is not inserted in the insertion hole.

According to the above configuration, since the opening of the insertion hole is closed when the leg of the flying vehicle is not inserted in the insertion hole, it is possible to prevent entry of foreign matters into the insertion hole when the leg is not inserted in the insertion hole.

The moving mechanism may include a grip mechanism for gripping the leg. The grip mechanism may grip the leg when the leg is secured by the securing device.

According to the above configuration, since the leg is held down by the grip mechanism, the influence of vibrations that may be transmitted to the flying vehicle can be alleviated, and the flying vehicle can be secured stably.

The grip mechanism may additionally grip the leg when the moving mechanism is moving the flying vehicle to the securing device.

According to the above configuration, the position and attitude of the flying vehicle can be stabilized when the flying vehicle is being moved.

At a time of takeoff of the flying vehicle, before the flying vehicle takes off, the moving mechanism may move the flying vehicle on the stage to the inward part located inward from the edge part.

According to the above configuration, as compared to the case where the flying vehicle is caused to take off from the edge part of the stage, the influence imparted to the flying vehicle from the environment (such as wind) around the takeoff/landing assist device can be alleviated.

The stage, the securing device, and the moving mechanism may be installed on a roof of a vehicle.

In cases where the takeoff/landing assist device is installed on a vehicle, there may be situations in which vibrations that occur during travel of the vehicle are transmitted to the flying vehicle, possibly resulting in position shift of the flying vehicle, unstable attitude of the flying vehicle, and the like. Even in such situations, since the flying vehicle is secured by the securing device, the influence of the vibrations that occur during travel can be alleviated, and the flying vehicle can be secured stably.

According to the present disclosure, in a takeoff/landing assist device having a stage on which a flying vehicle is to perform takeoff and landing, the flying vehicle can be secured on the stage.

BRIEF DESCRIPTION OF DRAWINGS

Embodiment(s) of the present disclosure will be described based on the following figures, wherein.

DESCRIPTION OF EMBODIMENTS

Figure 1:
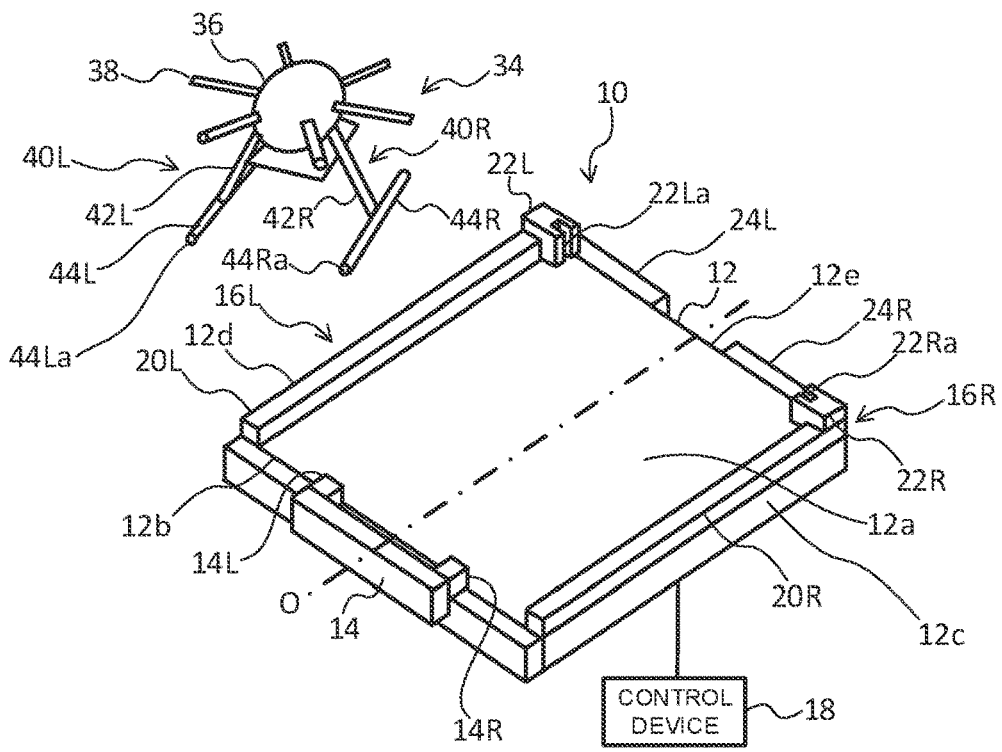
FIG. 1 is a perspective view showing a takeoff/landing assist device and a flying vehicle.
Figure 2:
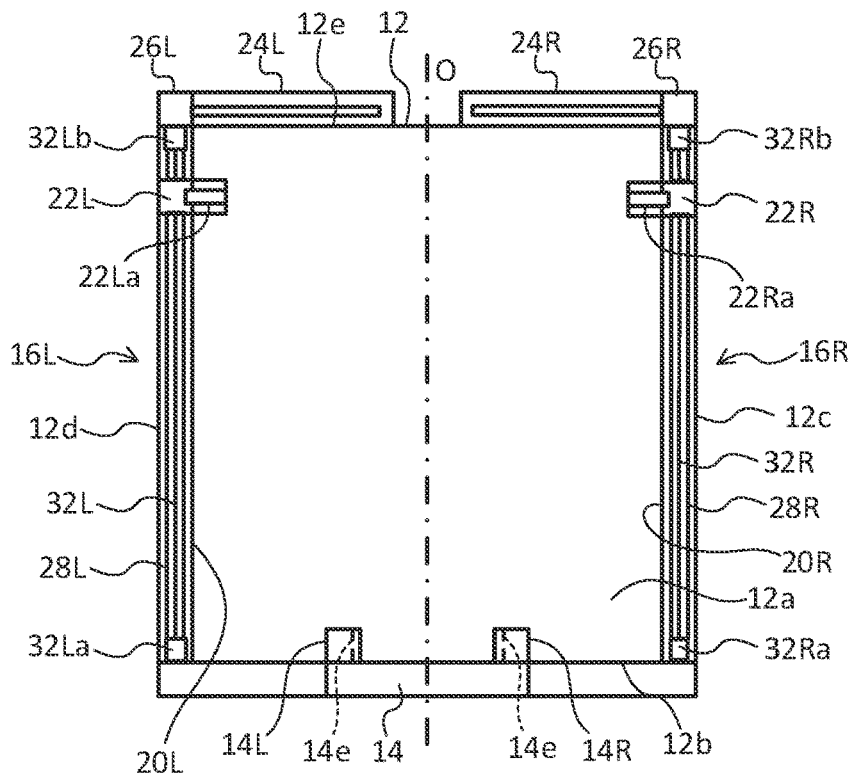
FIG. 2 is a plan view, seen from above, of the takeoff/landing assist device.

A takeoff/landing assist device 10 according to an embodiment will now be described by reference to FIGS. 1 and 2. FIG. 1 is a perspective view showing the takeoff/landing assist device 10 and a flying vehicle 34, and FIG. 2 is a plan view, seen from above, of the takeoff/landing assist device 10.

The takeoff/landing assist device 10 is a device for assisting takeoff and landing of a flying vehicle 34 such as a drone or a UAV. When a drone is used as the flying vehicle 34, the takeoff/landing assist device 10 may be referred to as a drone port. On the takeoff/landing assist device 10, cargo handling using the flying vehicle 34, power feed to the flying vehicle 34, replacement of parts of the flying vehicle 34, storage of the flying vehicle 34, and the like, for example, are carried out.

The takeoff/landing assist device 10 includes a stage 12, a securing device 14, moving mechanisms 16R and 16L, and a control device 18.

The stage 12 is a stage having a rectangular shape as a whole, on which the flying vehicle 34 performs takeoff and landing. Specifically, the stage 12 comprises a planar takeoff/landing surface 12a, and the flying vehicle 34 lands on and takes off from the takeoff/landing surface 12a. The stage 12 further comprises edge parts 12b, 12c, 12d, and 12e. The edge parts 12b and 12e are located facing each other, and the edge parts 12c and 12d are located facing each other. A line connecting between the center of the edge part 12b and the center of the edge part 12e defines the centerline O of the stage 12.

The securing device 14 is provided at the edge part 12b of the stage 12, and serves to secure the flying vehicle 34 on the stage 12. For example, the securing device 14 is provided on the edge part 12b at or near the center between the edge parts 12c and 12d.

The securing device 14 includes insertion parts 14R and 14L. The insertion parts 14R, 14L are provided along the edge part 12b at positions spaced apart from each other with the centerline O located in between. In each of the insertion parts 14R, 14L, a surface facing the edge part 12e includes an open portion; that is, in each of the insertion parts 14R, 14L, an insertion hole 14e is formed. As such, in the securing device 14, the insertion holes 14e are formed at two positions. As described later, by having legs of the flying vehicle 34 inserted in the insertion holes 14e, the flying vehicle 34 is secured on the stage by the securing device 14.

The moving mechanisms 16R and 16L serve to move the flying vehicle 34 on the stage 12. For example, the moving mechanisms 16R, 16L move the flying vehicle 34, which has landed on the stage 12 at a position located inward from the edge parts 12b, 12c, 12d, 12e, to the securing device 14, and thereby cause the legs of the flying vehicle 34 to be inserted into the insertion holes 14e.

The moving mechanism 16R includes a position correcting mechanism 20R and a grip mechanism 22R. The moving mechanism 16L includes a position correcting mechanism 20L and a grip mechanism 22L.

The position correcting mechanisms 20R and 20L are rod-like members extending across the stage 12 from the edge part 12b to the edge part 12e, and are arranged facing each other on the takeoff/landing surface 12a.

The position correcting mechanism 20R is located on the takeoff/landing surface 12a in a region toward the edge part 12c from the centerline O. The position correcting mechanism 20R is moved by an electric actuator 24R between the edge part 12c and the centerline O. For example, the position correcting mechanism 20R slides between the edge part 12c and the centerline O.

The electric actuator 24R is provided along the edge part 12e at a position toward the edge part 12c from the centerline O. As shown in FIG. 2, the electric actuator 24R comprises a slider 26R. The slider 26R is a member that can be moved by the electric actuator 24R along the edge part 12e between the centerline O and the edge part 12c. An end portion, on the edge part 12e side, of the position correcting mechanism 20R is coupled to the slider 26R. By moving the slider 26R along the edge part 12e using the electric actuator 24R, the position correcting mechanism 20R coupled to the slider 26R is moved.

The position correcting mechanism 20L is located on the takeoff/landing surface 12a in a region toward the edge part 12d from the centerline O. The position correcting mechanism 20L is moved by an electric actuator 24L between the edge part 12d and the centerline O. For example, the position correcting mechanism 20L slides between the edge part 12d and the centerline O.

The electric actuator 24L is provided along the edge part 12e at a position toward the edge part 12d from the centerline O. As shown in FIG. 2, the electric actuator 24L comprises a slider 26L. The slider 26L is a member that can be moved by the electric actuator 24L along the edge part 12e between the centerline O and the edge part 12d. An end portion, on the edge part 12e side, of the position correcting mechanism 20L is coupled to the slider 26L. By moving the slider 26L along the edge part 12e using the electric actuator 24L, the position correcting mechanism 20L coupled to the slider 26L is moved.

The grip mechanism 22R is a member that can be moved on and along the position correcting mechanism 20R by an electric actuator 28R. In other words, the grip mechanism 22R is a member that is movable between the edge parts 12b and 12e of the stage 12. For example, the grip mechanism 22R slides on the position correcting mechanism 20R. A groove 22Ra is formed in the grip mechanism 22R, and by causing a leg of the flying vehicle 34 to be hooked in the groove 22Ra, the grip mechanism 22R grips the leg of the flying vehicle 34.

The grip mechanism 22L is a member that can be moved on and along the position correcting mechanism 20L by an electric actuator 28L. In other words, the grip mechanism 22L is a member that is movable between the edge parts 12b and 12e of the stage 12. For example, the grip mechanism 22L slides on the position correcting mechanism 20L. A groove 22La is formed in the grip mechanism 22L, and by causing a leg of the flying vehicle 34 to be hooked in the groove 22La, the grip mechanism 22L grips the leg of the flying vehicle 34.

Figure 3:
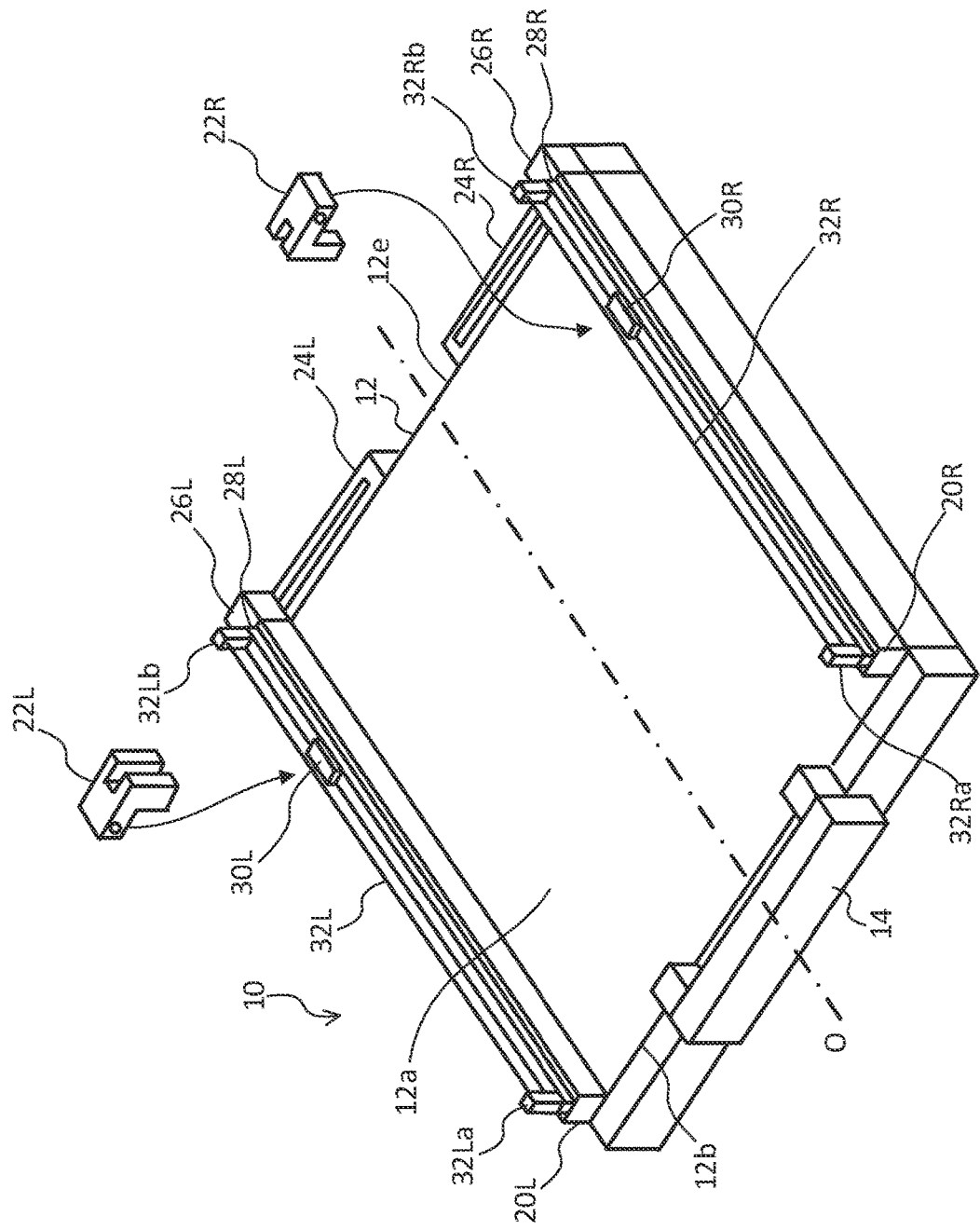
FIG. 3 is an exploded perspective view of the takeoff/landing assist device.
Figure 4A:
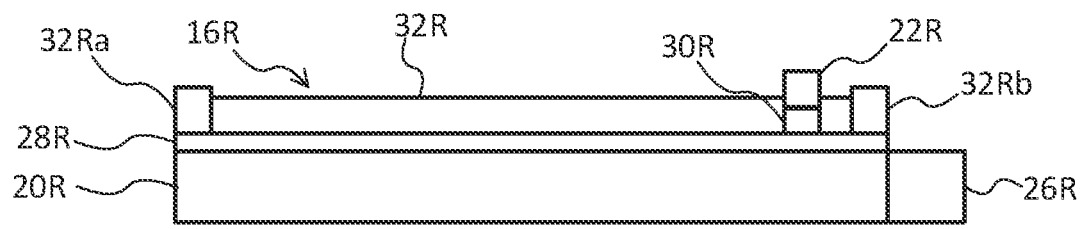
FIG. 4A is a side view of a moving mechanism 16R as seen from the side toward an edge part 12c.
Figure 4B:
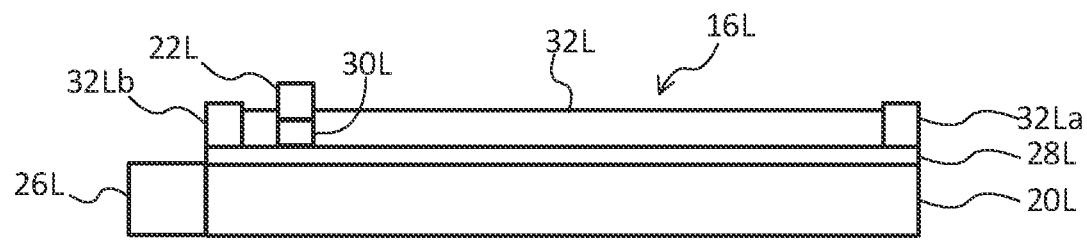
FIG. 4B is a side view of a moving mechanism 16L as seen from the side toward an edge part 12d.

The mechanism for moving the grip mechanisms 22R, 22L will now be described by reference to FIGS. 2, 3, 4A, and 4B. FIG. 3 is an exploded perspective view of the takeoff/landing assist device 10. FIG. 4A is a side view of the moving mechanism 16R as seen from the edge part 12c side. FIG. 4B is a side view of the moving mechanism 16L as seen from the edge part 12d side.

The grip mechanism 22R is moved by the electric actuator 28R, and the grip mechanism 22L is moved by the electric actuator 28L.

As shown in FIGS. 3 and 4A, the electric actuator 28R is provided on and along the position correcting mechanism 20R. The electric actuator 28R comprises a slider 30R. The slider 30R is a member that can be moved by the electric actuator 28R along the position correcting mechanism 20R. On the slider 30R, the grip mechanism 22R is mounted. In accordance with movement of the slider 30R, the grip mechanism 22R is also moved. Further, a pivot shaft 32R is provided on and along the position correcting mechanism 20R. On the electric actuator 28R, a bearing 32Ra that supports one end portion of the pivot shaft 32R is provided on the edge part 12b side, and a bearing 32Rb that supports the other end portion of the pivot shaft 32R is provided on the edge part 12e side. The grip mechanism 22R is capable of pivoting around the pivot shaft 32R. This pivoting movement is, for example, effected by a motor.

As shown in FIGS. 3 and 4B, the electric actuator 28L is provided on and along the position correcting mechanism 20L. The electric actuator 28L comprises a slider 30L. The slider 30L is a member that can be moved by the electric actuator 28L along the position correcting mechanism 20L. On the slider 30L, the grip mechanism 22L is mounted. In accordance with movement of the slider 30L, the grip mechanism 22L is also moved. Further, a pivot shaft 32L is provided on and along the position correcting mechanism 20L. On the electric actuator 28L, a bearing 32La that supports one end portion of the pivot shaft 32L is provided on the edge part 12b side, and a bearing 32Lb that supports the other end portion of the pivot shaft 32L is provided on the edge part 12e side. The grip mechanism 22L is capable of pivoting around the pivot shaft 32L. This pivoting movement is, for example, effected by a motor.

It should be noted that in the drawings other than FIGS. 2, 3, 4A, and 4B, illustration of the electric actuators 28R, 28L, the sliders 30R, 30L, the pivot shafts 32R, 32L, and the bearings 32Ra, 32Rb, 32La, 32Lb is omitted for convenience of explanation.

As the electric actuators 24R, 24L, 28R, 28L, known actuators can be used. For example, the electric actuators 24R, 24L, 28R, 28L are constituted by combining components such as a ball screw, a belt and pulley mechanism, a rack and pinion mechanism, a linear guide, and a motor. It should be noted that electric actuators are simply one example of structure for moving the position correcting mechanisms 20R, 20L and the grip mechanisms 22R, 22L. Actuators other than electric actuators may be used to control movement of the position correcting mechanisms 20R, 20L and the grip mechanisms 22R, 22L.

The control device 18 controls operations of the moving mechanisms 16R, 16L, power feed to the flying vehicle 34, and the like. For example, the control device 18 controls movement of the position correcting mechanisms 20R, 20L and the grip mechanisms 22R, 22L, and thereby causes the flying vehicle 34 that has landed on the takeoff/landing surface 12a to slide and move to the securing device 14.

The functions of the control device 18 can be implemented using, for example, hardware resources such as processors and electronic circuits, and in implementing those functions, devices such as a memory may be used as necessary. For example, the control device 18 is a computer. The functions of the control device 18 may be implemented by cooperation of hardware resources, such as a CPU (central processing unit) and a memory provided in the computer, and software (a program) that defines operations of the CPU and the like. The program is stored into a storage device via a recording medium such as a CD or DVD, or via a communication path such as a network. In another example, the functions of the control device 18 may be implemented by a DSP (digital signal processor), a FPGA (field-programmable gate array), or the like.

As shown in FIG. 1, the flying vehicle 34 is a drone, a UAV, or the like, and comprises, for example, a vehicle body 36, propellers 38 for flight, and a pair of legs 40R and 40L. As the flying vehicle 34, known drones and UAVs can be used.

The flying vehicle 34 includes a battery, a motor for driving the propellers 38, various sensors (such as a gyro sensor, acceleration sensor, geomagnetic sensor, atmospheric pressure sensor, and GPS (global positioning system)), a computer for flight that controls the flying vehicle 34, various drivers, a communication interface including a transmitter and a receiver, and the like.

The computer for flight of the flying vehicle 34 controls the motor so as to, for example, control the flight (such as ascent, descent, and horizontal movement) of the flying vehicle 34, and control the attitude of the flying vehicle 34 based on information obtained by a gyro sensor.

The flying vehicle 34 is controlled by, for example, a terminal device (such as a drone controller, smartphone, or tablet terminal) possessed by a user who steers the flying vehicle 34, or a device such as a server (such as a cloud server). The terminal device or the server controls the flying vehicle 34 by transmitting, to the flying vehicle 34, steering command signals indicating steering commands for the flying vehicle 34. The communication interface of the flying vehicle 34 receives the steering command signals transmitted from the terminal device or the server, and the computer for flight of the flying vehicle 34 controls the flight and attitude of the flying vehicle 34 according to those steering command signals.

The leg 40R includes a supporting leg portion 42R and a horizontal leg portion 44R. The supporting leg portion 42R is a rod-like member extending downward from the vehicle body 36. To the lower end of the supporting leg portion 42R, the horizontal leg portion 44R is connected. The horizontal leg portion 44R is a horizontally-extending rod-like member, and supports the vehicle body 36 via the supporting leg portion 42R when the flying vehicle 34 has landed on the stage 12.

The leg 40L includes a supporting leg portion 42L and a horizontal leg portion 44L. The supporting leg portion 42L is a rod-like member extending downward from the vehicle body 36. To the lower end of the supporting leg portion 42L, the horizontal leg portion 44L is connected. The horizontal leg portion 44L is a horizontally-extending rod-like member, and supports the vehicle body 36 via the supporting leg portion 42L when the flying vehicle 34 has landed on the stage 12.

For example, the horizontal leg portions 44R and 44L are arranged by being spaced apart from each other in parallel or in an angular relationship similar thereto.

One end portion 44Ra of the horizontal leg portion 44R is inserted into the insertion hole 14e formed in the insertion part 14R, and one end portion 44La of the horizontal leg portion 44L (i.e., the end portion located on the same side as the end portion 44Ra) is inserted into the insertion hole 14e formed in the insertion part 14L. The distance between the insertion parts 14R and 14L corresponds to the distance between the horizontal leg portions 44R and 44L. The insertion part 14R is provided at a position corresponding to the horizontal leg portion 44R of the flying vehicle 34 that has been moved on the takeoff/landing surface 12a to the securing device 14. The insertion part 14L is provided at a position corresponding to the horizontal leg portion 44L of the flying vehicle 34 that has been moved to the securing device 14.

Figure 5:
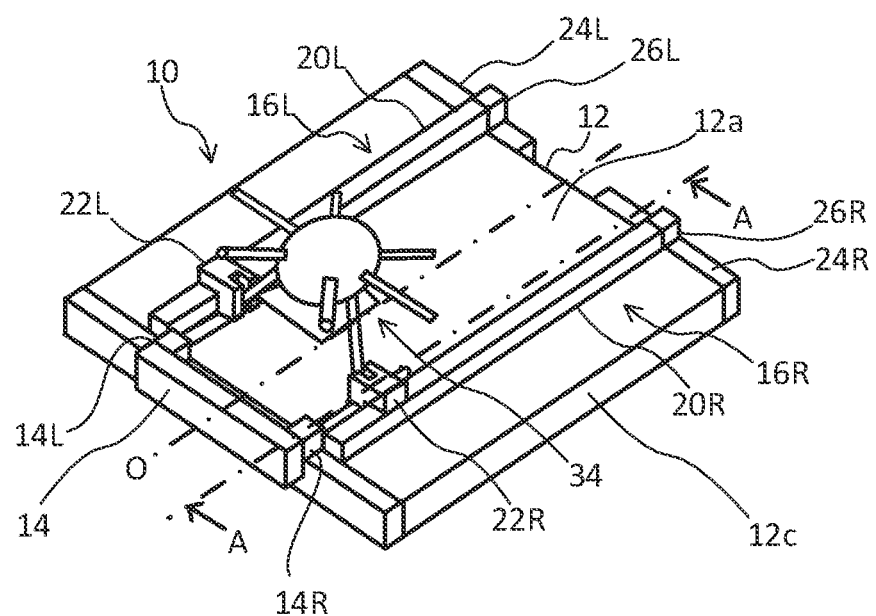
FIG. 5 is a perspective view showing a state in which the flying vehicle is secured by a securing device of the takeoff/landing assist device.

A state in which the flying vehicle 34 is secured by the securing device 14 will now be described by reference to FIG. 5. FIG. 5 is a perspective view showing the takeoff/landing assist device 10 and the flying vehicle 34.

The flying vehicle 34 that has landed on the takeoff/landing surface 12a is moved by the moving mechanisms 16R, 16L to the edge part 12b. Specifically, the flying vehicle 34 is moved to the securing device 14, and the end portion 44Ra of the horizontal leg portion 44R is inserted into the insertion hole 14e of the insertion part 14R while the end portion 44La of the horizontal leg portion 44L is inserted into the insertion hole 14e of the insertion part 14L. As a result, the flying vehicle 34 is secured on the stage 12 by the securing device 14. The operation for moving the flying vehicle 34 that has landed on the takeoff/landing surface 12a to the securing device 14 will be described later in detail.

Figure 6:
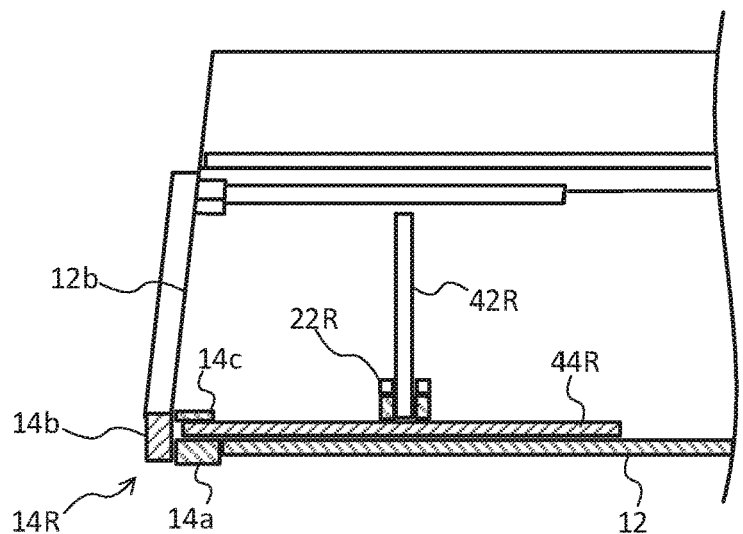
FIG. 6 is a cross-sectional view taken along A-A in FIG. 5.

The securing device 14 will now be described by reference to FIGS. 6 to 11. FIG. 6 is a diagram illustrating cross section A-A in FIG. 5, and shows a cross section of a part of the takeoff/landing assist device 10. FIGS. 7 to 11 are cross-sectional views of an insertion part of the securing device 14.

As mentioned above, each of the insertion parts 14R, 14L has an insertion hole 14e formed therein. Although FIGS. 6 to 11 do not show cross sections of the insertion part 14L and only show cross sections of the insertion part 14R, the insertion part 14L has a structure similar to the insertion part 14R.

Figure 7:
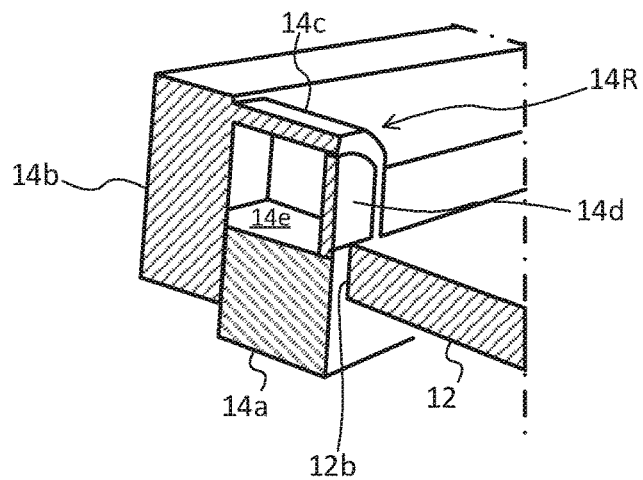
FIG. 7 is a cross-sectional perspective view showing an insertion part of the securing device.
Figure 8:
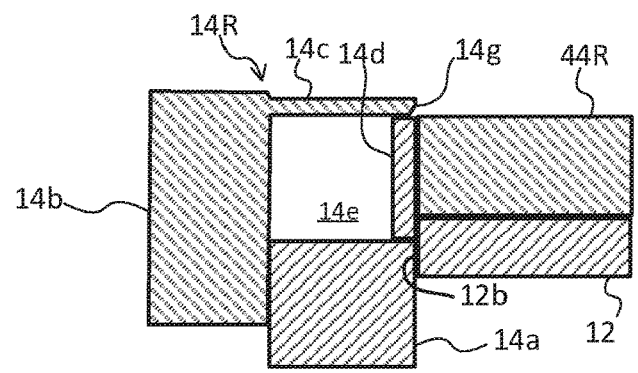
FIG. 8 is a cross-sectional view showing the insertion part of the securing device.

As shown in FIGS. 6 to 8, the securing device 14 includes wall members 14a and 14b, a projecting portion 14c, and a lid 14*d*. The wall members 14*a*, 14*b* are members extending along the edge part 12*b* of the stage 12. The projecting portion 14*c* is provided at a position corresponding to the horizontal leg portion 44R of the flying vehicle 34 that has been moved to the securing device 14, and is a member projecting from the wall member 14*b* toward the inward part of the stage 12. The wall members 14*a*, 14*b* and the projecting portion 14*c* constitute the insertion part 14R, and the space surrounded by the wall members 14*a*, 14*b* and the projecting portion 14*c* corresponds to the insertion hole 14*e*. Into the insertion hole 14*e* of the insertion part 14R, the end portion 44Ra of the horizontal leg portion 44R is inserted.

Regarding the insertion part 14L, the projecting portion 14*c* is similarly provided at a position corresponding to the horizontal leg portion 44L of the flying vehicle 34 that has been moved to the securing device 14. The wall members 14*a*, 14*b* and the projecting portion 14*c* constitute the insertion part 14L, and the insertion hole 14*e* is formed inside the insertion part 14L. Into the insertion hole 14*e* of the insertion part 14L, the end portion 44La of the horizontal leg portion 44L is inserted.

The lid 14*d* is a movable lid that is provided at the opening of the insertion hole 14*e* and that serves to close the opening of the insertion hole 14*e*. The lid 14*d* of the insertion part 14R opens the opening of the insertion hole 14*e* when the horizontal leg portion 44R is inserted into the insertion hole 14*e* of the insertion part 14R, and closes the opening by an urging force or other forces of a spring (not shown in drawing) or the like when the horizontal leg portion 44R is not inserted in the insertion hole 14*e*. Similarly, the lid 14*d* of the insertion part 14L opens the opening of the insertion hole 14*e* when the horizontal leg portion 44L is inserted into the insertion hole 14*e* of the insertion part 14L, and closes the opening when the horizontal leg portion 44L is not inserted in the insertion hole 14*e*.

Figure 9:
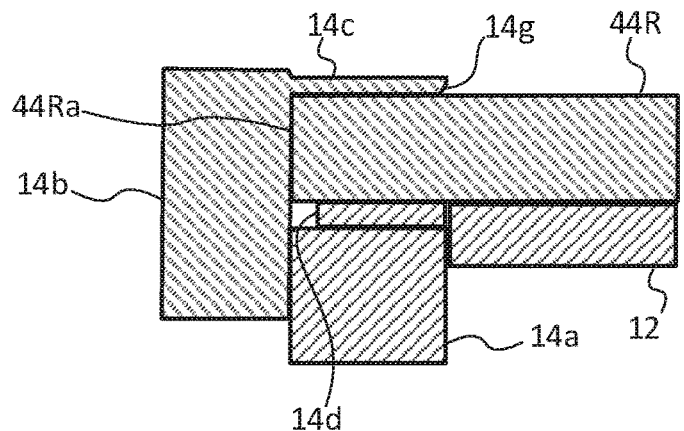
FIG. 9 is a cross-sectional view showing the insertion part of the securing device.

For example, the lid 14*d* is attached to the wall member 14*a* or the projecting portion 14*c* by a hinge. In that case, when the flying vehicle 34 is moved to the securing device 14, the end portion 44Ra of the horizontal leg portion 44R pushes the lid 14*d* of the insertion part 14R into the insertion hole 14*e*. As a result, as shown in FIG. 9, the lid 14*d* flops down toward the inside of the insertion hole 14*e* and opens the opening of the insertion hole 14*e*, and the end portion 44Ra is inserted into the insertion hole 14*e*. The end portion 44La of the horizontal leg portion 44L is similarly inserted into the insertion hole 14*e* of the insertion part 14L.

When the flying vehicle 34 is moved away from the securing device 14, the end portion 44Ra of the horizontal leg portion 44R is pulled out of the insertion hole 14*e* of the insertion part 14R. As a result, as shown in FIG. 8, the lid 14*d* that has flopped down toward the inside of the insertion hole 14*e* stands up and closes the opening of the insertion hole 14*e*. As for the lid 14*d* of the insertion part 14L, when the end portion 44La of the horizontal leg portion 44L is pulled out of the insertion hole 14*e* of the insertion part 14L, the lid 14*d* closes the opening of the insertion hole 14*e* in a similar manner.

Figure 10:
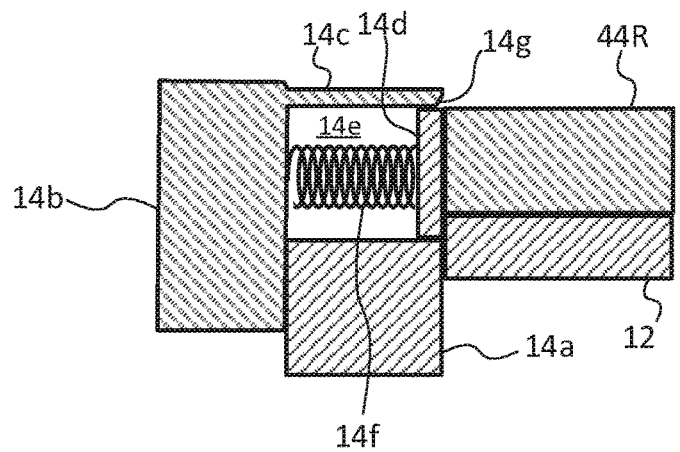
FIG. 10 is a cross-sectional view showing a different embodiment of the insertion part of the securing device.
Figure 11:
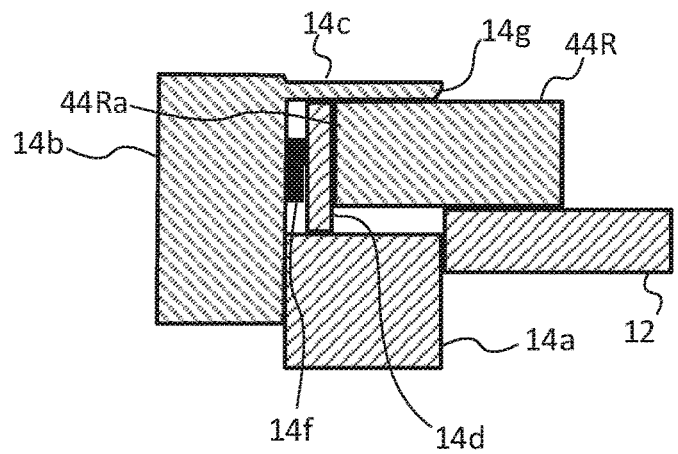
FIG. 11 is a cross-sectional view showing the different embodiment of the insertion part of the securing device.

In another example, as shown in FIG. 10, a spring 14*f* may be provided between the wall member 14*b* and the lid 14*d*. One end portion of the spring 14*f* is fixed to the wall member 14*b*, and the other end portion is fixed to the lid 14*d*. When the flying vehicle 34 is moved to the securing device 14, the end portion 44Ra of the horizontal leg portion 44R pushes the lid 14*d* of the insertion part 14R toward the wall member 14*b*. As a result, as shown in FIG. 11, the spring 14*f* contracts. When the lid 14*d* is pushed toward the wall member 14*b*, the opening of the insertion hole 14*e* is opened, and the end portion 44Ra is inserted into the insertion hole 14*e*. The end portion 44La of the horizontal leg portion 44L is inserted into the insertion hole 14*e* of the insertion part 14L in a similar manner.

When the flying vehicle 34 is moved away from the securing device 14, the end portion 44Ra of the horizontal leg portion 44R is pulled out of the insertion hole 14*e* of the insertion part 14R. As a result, as shown in FIG. 10, the lid 14*d* is pushed to the opening of the insertion hole 14*e* by the elastic force (or restoring force) of the spring 14*f*, and closes the opening. As for the lid 14*d* of the insertion part 14L, when the end portion 44La of the horizontal leg portion 44L is pulled out of the insertion hole 14*e* of the insertion part 14L, the lid 14*d* is similarly pushed to the opening of the insertion hole 14*e* by the elastic force of the spring 14*f*, and closes the opening.

Further, in order to facilitate insertion of the end portions 44Ra, 44La into the respective insertion holes 14*e*, a tip part 14*g* of each projecting portion 14*c* is cut at an angle toward the insertion hole 14*e* so as to guide the corresponding end portion 44Ra, 44La inside.

On the inside of the insertion hole 14*e* (for example, on an inner surface of the insertion hole 14*e*) of the insertion part 14R, there is provided a contact that is electrically connectable to the end portion 44Ra of the horizontal leg portion 44R inserted in the insertion hole 14*e*. Similarly, on the inside of the insertion hole 14*e* of the insertion part 14L, there is provided a contact that is electrically connectable to the end portion 44La of the horizontal leg portion 44L inserted in the insertion hole 14*e*. For example, each contact is formed by providing, on an inner surface of the corresponding insertion hole 14*e*, a metal member for use as an electrode.

In the insertion hole 14*e* of the insertion part 14R and in the insertion hole 14*e* of the insertion part 14L, contacts having polarities different from each other are provided. In other words, a contact having either one of positive or negative polarity (for example, a positive contact) is provided in the insertion hole 14*e* of the insertion part 14R, while a contact having the other one of positive or negative polarity (for example, a negative contact) is provided in the insertion hole 14*e* of the insertion part 14L.

Electrodes are provided at the end portion 44Ra of the horizontal leg portion 44R and at the end portion 44La of the horizontal leg portion 44L. By inserting the end portion 44Ra into the insertion hole 14*e* of the insertion part 14R, the electrode provided at the end portion 44Ra comes into contact with the contact in the insertion hole 14*e*. As a result, the electrode provided at the end portion 44Ra and the contact in the insertion hole 14*e* are electrically connected to each other. Similarly, by inserting the end portion 44La into the insertion hole 14*e* of the insertion part 14L, the electrode provided at the end portion 44La comes into contact with the contact in the insertion hole 14*e*. As a result, the electrode provided at the end portion 44La and the contact in the insertion hole 14*e* are electrically connected to each other.

For example, via the contacts in the insertion holes 14*e* and the end portions 44Ra, 44La, electric power is supplied from the takeoff/landing assist device 10 or other devices to the battery of the flying vehicle 34, and the battery of the flying vehicle 34 is charged.

By providing the positive contact and the negative contact in separate insertion holes 14*e* as described above, it is possible to prevent situations in which the positive contact and the negative contact come into contact with each other and a short circuit is generated. For example, even when foreign matter enters into an insertion hole 14*e*, generation of a short circuit due to the positive contact and the negative contact coming into contact with each other can be prevented.

Further, by providing the lids 14d, the openings of the insertion holes 14e are closed when the end portions 44Ra, 44La are not inserted in the insertion holes 14e, and therefore entry of foreign matter and water into the insertion holes 14e from the outside can be prevented.

It is noted that, alternatively, the opposite end portion of the horizontal leg portion 44R located opposite to the end portion 44Ra may be inserted into the insertion hole 14e of the insertion part 14R, and the opposite end portion of the horizontal leg portion 44L located opposite to the end portion 44La may be inserted into the insertion hole 14e of the insertion part 14L. Those opposite end portions may have electrodes formed thereon, and using those electrodes, electrical connection with the contacts in the insertion holes 14e may be achieved. Both end portions of each of the horizontal leg portions 44R, 44L may have electrodes provided thereon.

Figure 15:
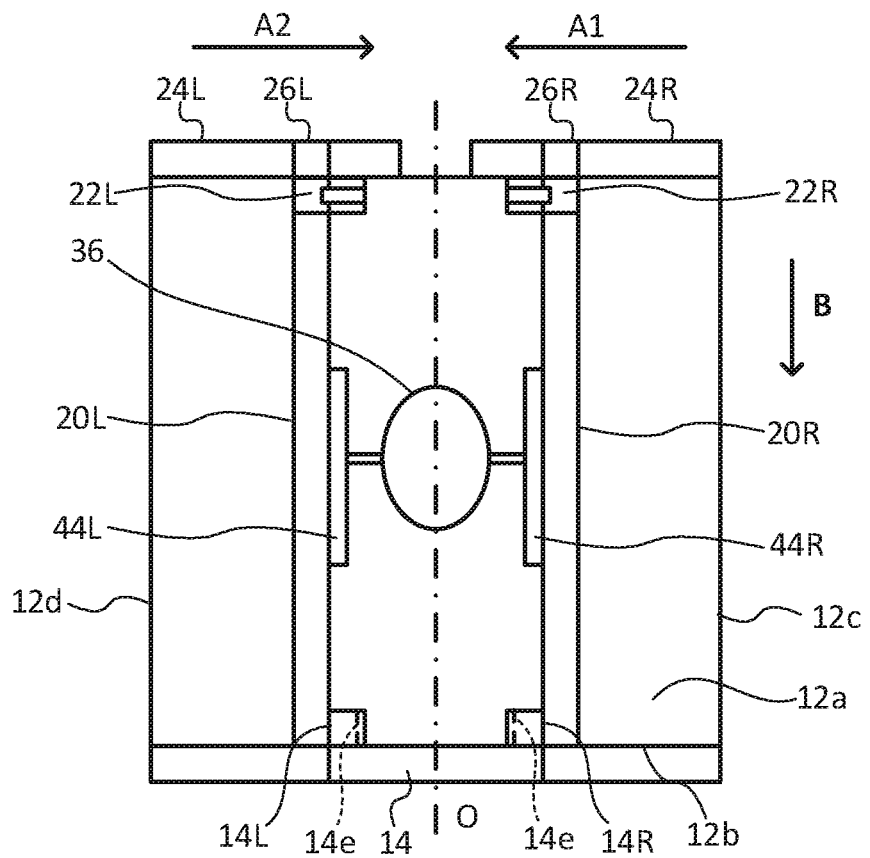
FIG. 15 is a plan view, seen from above, of a state in which the flying vehicle is sandwiched by the position correcting mechanisms.
Figure 16:
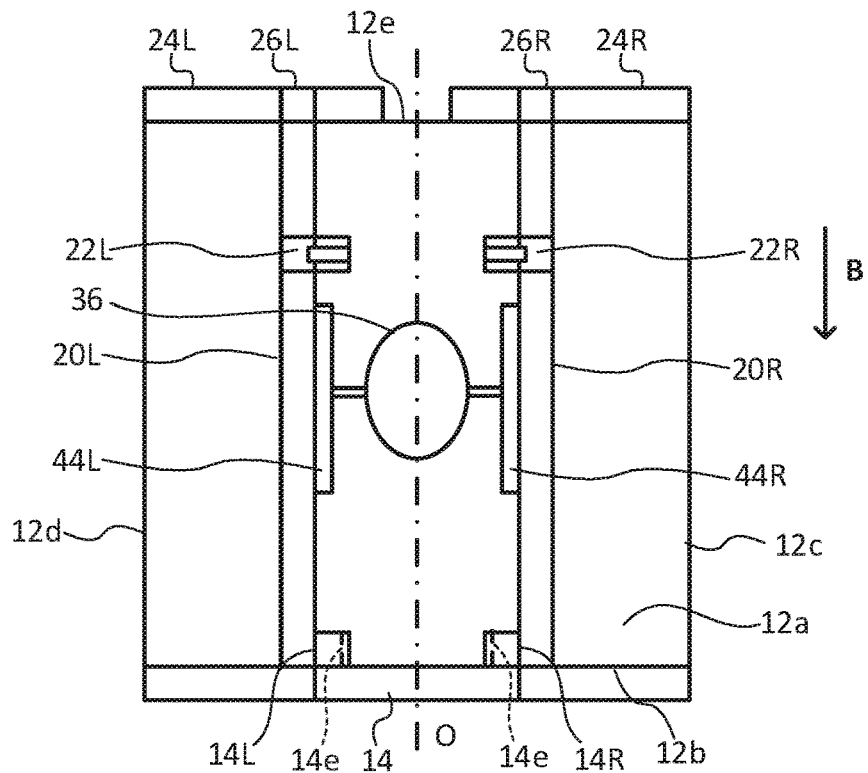
FIG. 16 is a plan view, seen from above, of a state in which the flying vehicle is sandwiched by the position correcting mechanisms.
Figure 17:
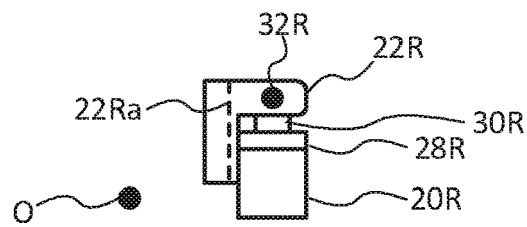
FIG. 17 is a front view of a grip mechanism 22R as seen from the side toward an edge part 12b.
Figure 18:
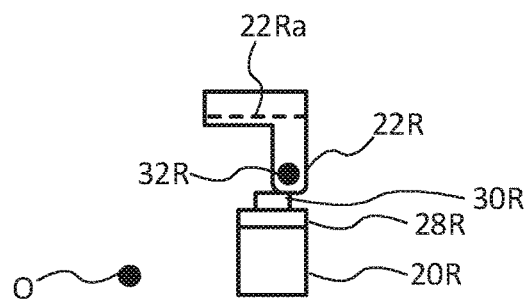
FIG. 18 is a front view of the grip mechanism 22R as seen from the side toward the edge part 12b.

Operations of the takeoff/landing assist device 10 will now be described by reference to FIGS. 12 to 22. FIGS. 12 to 14, 20, and 21 are perspective views showing the takeoff/landing assist device 10 and the flying vehicle 34. FIGS. 15, 16, 19, and 22 are plan views, seen from above, of the takeoff/landing assist device 10 and the flying vehicle 34. FIGS. 17 and 18 are front views of the grip mechanism 22R as seen from the edge part 12b side. In FIGS. 15, 16, 19, and 22, illustration of the propellers 38 of the flying vehicle 34 is omitted for convenience of explanation.

Figure 12:
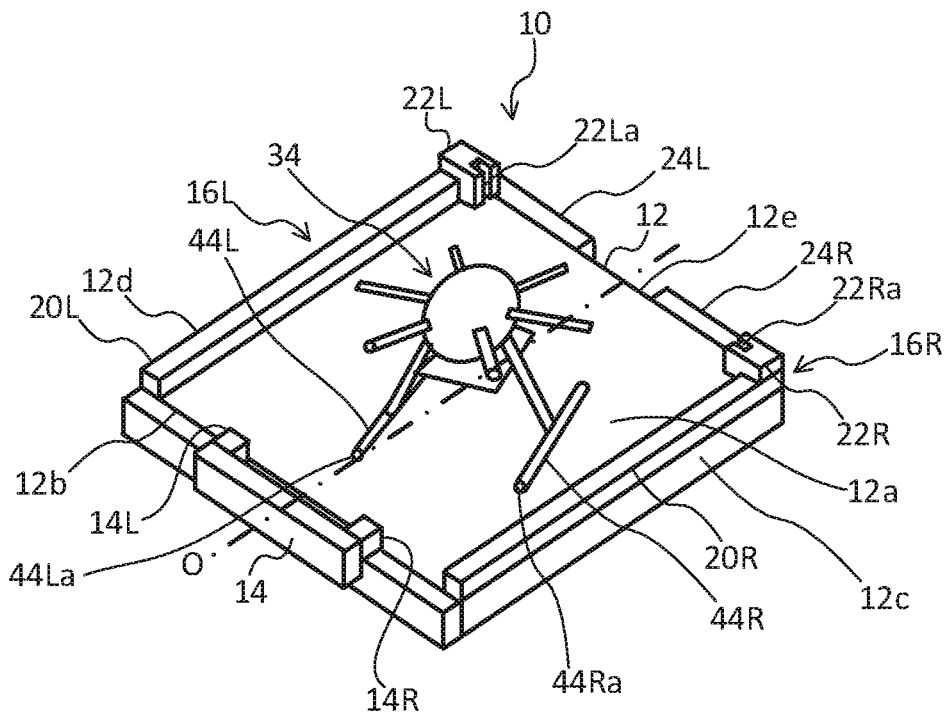
FIG. 12 is a perspective view showing a state in which the flying vehicle has landed on the takeoff/landing assist device.

Before the flying vehicle 34 lands on the takeoff/landing surface 12a, as shown in FIG. 12, the position correcting mechanism 20R is located at the edge part 12c of the stage, and the position correcting mechanism 20L is located at the edge part 12d of the stage. Further, the grip mechanism 22R is located on the position correcting mechanism 20R at a position toward the edge part 12e, and the grip mechanism 22L is located on the position correcting mechanism 20L at a position toward the edge part 12e.

As shown in FIG. 12, when the flying vehicle 34 has landed on the takeoff/landing surface 12a, a signal indicating the landing of the flying vehicle 34 on the takeoff/landing surface 12a is transmitted to the control device 18 from the flying vehicle 34 or a device such as a terminal device or server that controls the flying vehicle 34. By receiving this signal, the control device 18 recognizes that the flying vehicle 34 has landed on the takeoff/landing surface 12a.

Figure 13:
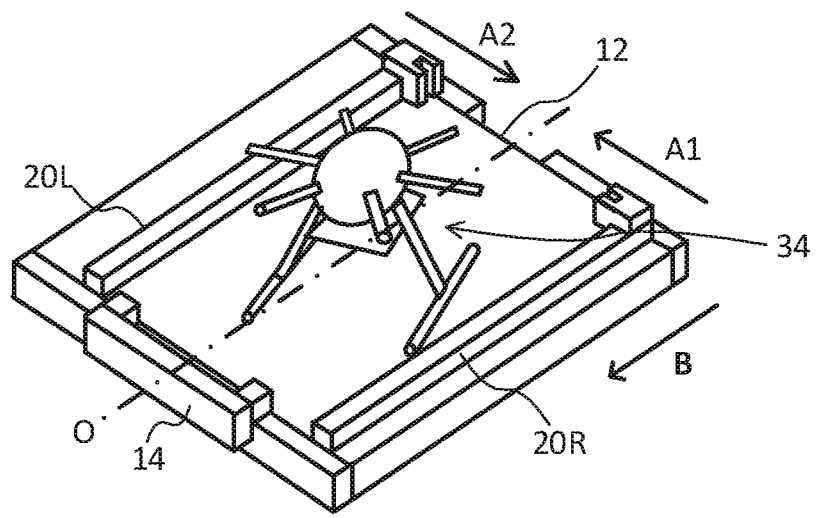
FIG. 13 is a perspective view showing a state in which the flying vehicle has landed on the takeoff/landing assist device.
Figure 14:
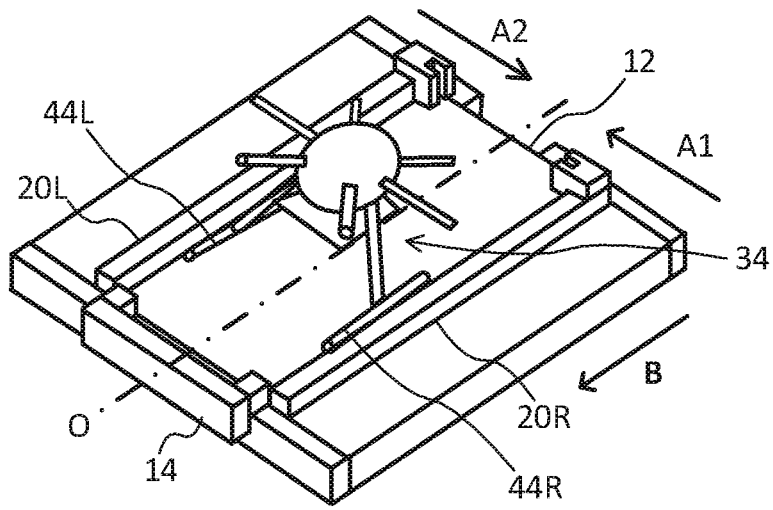
FIG. 14 is a perspective view showing a state in which the flying vehicle is sandwiched by position correcting mechanisms.

When the flying vehicle 34 has landed on the takeoff/landing surface 12a, as shown in FIG. 13, the control device 18 activates the electric actuators 24R, 24L and thereby moves the position correcting mechanisms 20R, 20L. Specifically, the control device 18 moves the position correcting mechanism 20R from the edge part 12c toward the centerline O as indicated by arrow A1, and moves the position correcting mechanism 20L from the edge part 12d toward the centerline O as indicated by arrow A2. By doing so, as shown in FIGS. 14 and 15, the control device 18 causes the position correcting mechanisms 20R, 20L to sandwich the horizontal leg portions 44R, 44L and cause the flying vehicle 34 to slide to a position along the centerline O.

For example, the surface of the position correcting mechanism 20R on the centerline O side abuts on the horizontal leg portion 44R, and as the position correcting mechanism 20R further moves toward the centerline O, the flying vehicle 34 is caused to slide on the takeoff/landing surface 12a. Similarly, the surface of the position correcting mechanism 20L on the centerline O side abuts on the horizontal leg portion 44L, and as the position correcting mechanism 20L further moves toward the centerline O, the flying vehicle 34 is caused to slide on the takeoff/landing surface 12a. In this way, the position correcting mechanisms 20R, 20L sandwich the horizontal leg portions 44R, 44L from both sides and cause the flying vehicle 34 to slide to a position along the centerline O.

Even in cases where the flying vehicle 34 has landed on the takeoff/landing surface 12a at a slant with respect to the edge part 12b as shown in FIG. 12, by sandwiching the horizontal leg portions 44R, 44L from both sides with the position correcting mechanisms 20R, 20L, the flying vehicle 34 can be turned to face the edge part 12b. In other words, the end portions 44Ra, 44La can be turned to face the edge part 12b.

Here, as one example, the flying vehicle 34 has landed on the takeoff/landing surface 12a in such a manner that, when the horizontal leg portions 44R, 44L are sandwiched between the position correcting mechanisms 20R, 20L, the end portions 44Ra, 44La are turned to face the edge part 12b. In this case, the respective end portions 44Ra, 44La will be inserted into the insertion holes 14e as described later.

Alternatively, the flying vehicle 34 may land on the takeoff/landing surface 12a in such a manner that, when the horizontal leg portions 44R, 44L are sandwiched between the position correcting mechanisms 20R, 20L, the opposite end portions located opposite to the end portions 44Ra, 44La are turned to face the edge part 12b. In this case, those opposite end portions will be inserted into the insertion holes 14e.

Further, the control device 18 activates the electric actuators 28R, 28L which thereby move the grip mechanisms 22R, 22L. Specifically, as shown in FIG. 16, the control device 18 moves the grip mechanisms 22R, 22L from the edge part 12e side toward the edge part 12b as indicated by arrow B.

Operations of the grip mechanisms 22R, 22L at that time will now be described by reference to FIGS. 17 and 18.

As shown in FIG. 17, while having the grip mechanism 22R pivoted around the pivot shaft 32R toward the centerline O and tilted or turned down toward the centerline O, the control device 18 moves the grip mechanism 22R from the edge part 12e side toward the edge part 12b. As for the grip mechanism 22L, similarly, while having the grip mechanism 22L pivoted around the pivot shaft 32L toward the centerline O and tilted or turned down toward the centerline O, the control device 18 moves the grip mechanism 22L from the edge part 12e side toward the edge part 12b.

During the above movement, when the tilted grip mechanism 22R comes into contact with the supporting leg portion 42R of the flying vehicle 34, the control device 18 rotates the grip mechanism 22R around the pivot shaft 32R in the direction opposite to the centerline O side and causes the grip mechanism 22R to stand up as shown in FIG. 18. The control device 18 then adjusts the position of the grip mechanism 22R such that the position of the groove 22Ra of the grip mechanism 22R aligns with the supporting leg portion 42R of the flying vehicle 34, and rotates the grip mechanism 22R toward the centerline O as shown in FIG. 17. As for the grip mechanism 22L, similarly, when the tilted grip mechanism 22L comes into contact with the supporting leg portion 42L of the flying vehicle 34, the control device 18 rotates the grip mechanism 22L around the pivot shaft 32L in the direction opposite to the centerline O side, and causes the grip mechanism 22L to stand up. The control device 18 then adjusts the position of the grip mechanism 22L such that the position of the groove 22La of the grip mechanism 22L aligns with the supporting leg portion 42L of the flying vehicle 34, and rotates the grip mechanism 22L toward the centerline O.

Figure 19:
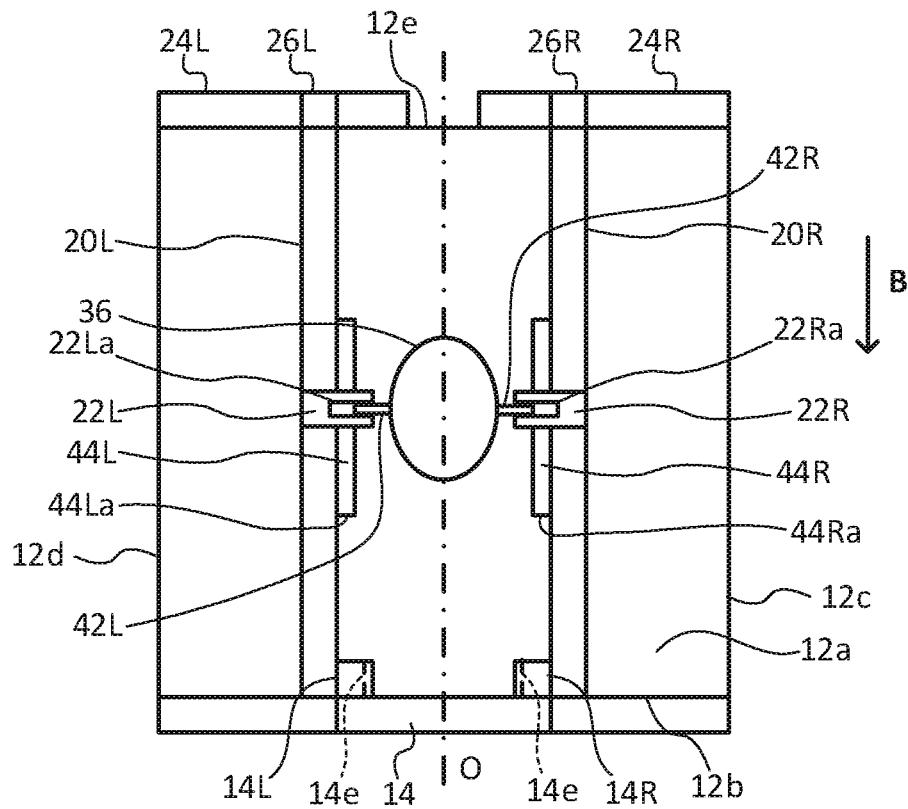
FIG. 19 is a plan view, seen from above, of a state in which supporting leg portions of the flying vehicle are gripped by grip mechanisms.
Figure 20:
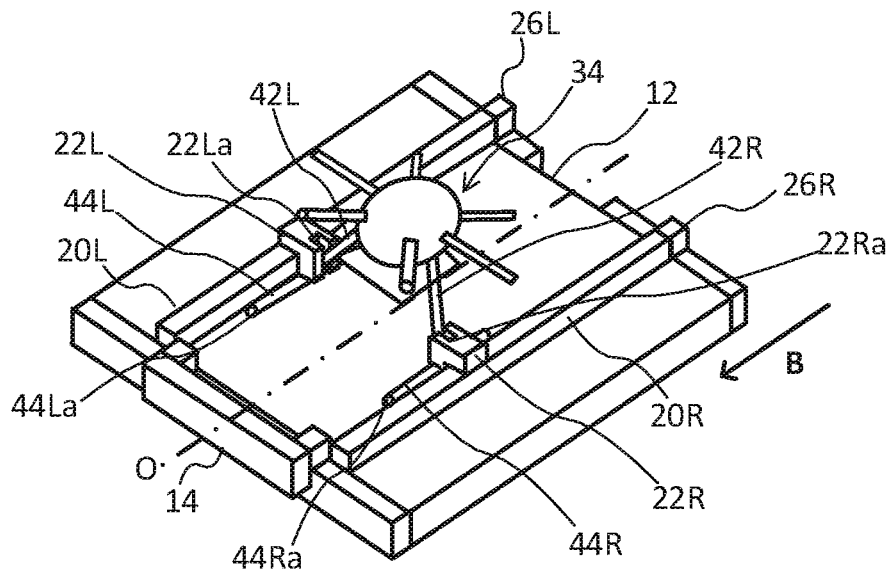
FIG. 20 is a perspective view of a state in which the supporting leg portions of the flying vehicle are gripped by the grip mechanisms.

As a result, as shown in FIGS. 19 and 20, the supporting leg portion 42R is hooked in the groove 22Ra and gripped by the grip mechanism 22R. Similarly, the supporting leg portion 42L is hooked in the groove 22La and gripped by the grip mechanism 22L.

Figure 21:
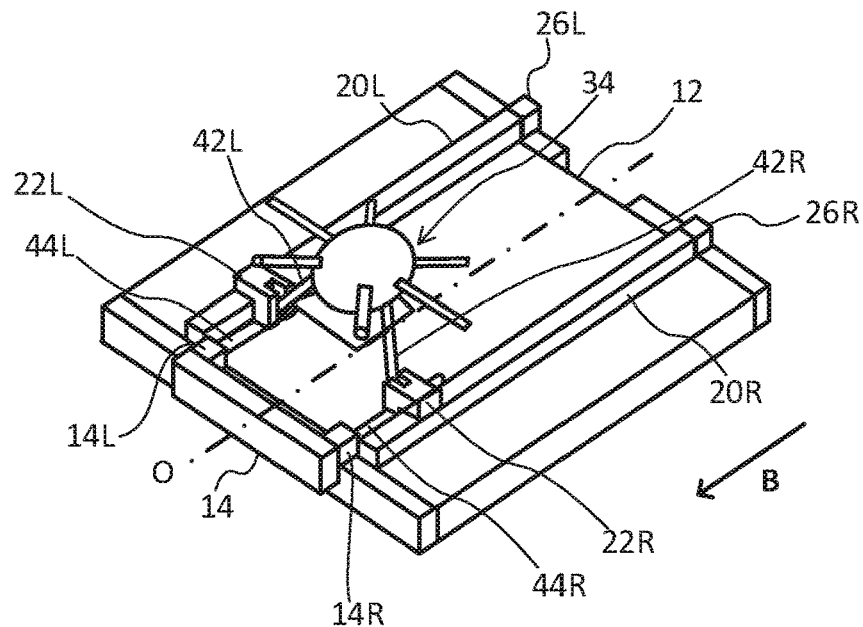
FIG. 21 is a perspective view showing a state in which the flying vehicle is secured by the securing device of the takeoff/landing assist device.
Figure 22:
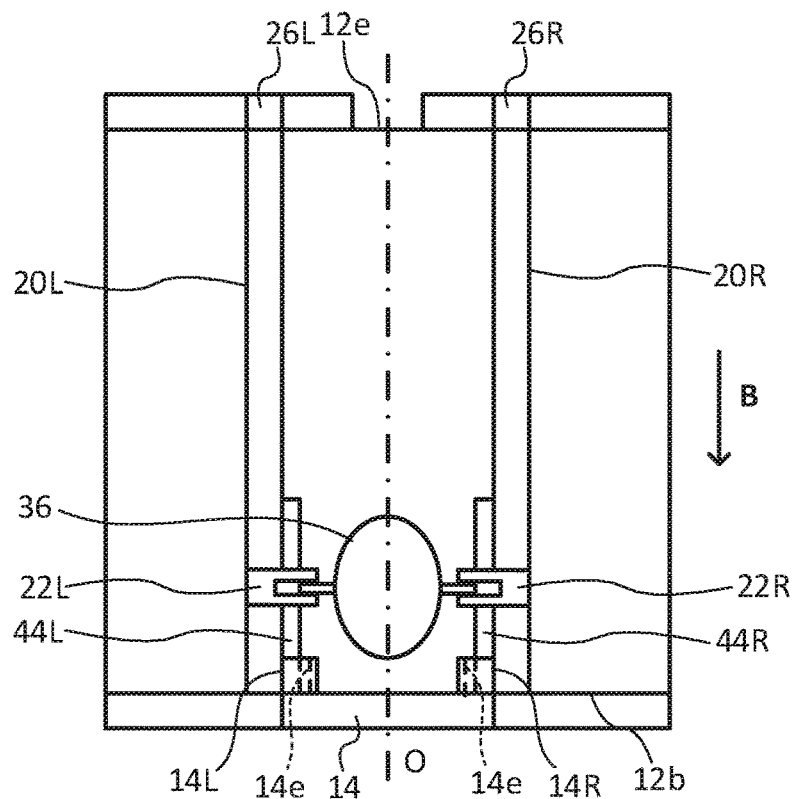
FIG. 22 is a plan view, seen from above, of a state in which the flying vehicle is secured by the securing device of the takeoff/landing assist device.

As shown in FIGS. 21 and 22, with the horizontal leg portions 44R, 44L being sandwiched between the position correcting mechanisms 20R, 20L and with the supporting leg portions 42R, 42L being gripped by the grip mechanisms 22R, 22L, the control device 18 moves the grip mechanisms 22R, 22L toward the securing device 14. As a result, the flying vehicle 34 slides toward the securing device 14, and the end portion 44Ra of the horizontal leg portion 44R is inserted into the insertion hole 14e of the insertion part 14R while the end portion 44La of the horizontal leg portion 44L is inserted into the insertion hole 14e of the insertion part 14L. As such, the flying vehicle 34 is secured on the stage 12 by the securing device 14.

By inserting the end portion 44Ra of the horizontal leg portion 44R into the insertion hole 14e of the insertion part 14R and inserting the end portion 44La of the horizontal leg portion 44L into the insertion hole 14e of the insertion part 14L as described above, the flying vehicle 34 can be mechanically secured on the stage 12 by the securing device 14.

By sandwiching the horizontal leg portions 44R, 44L from both sides with the position correcting mechanisms 20R, 20L, position shift of the flying vehicle 34 in the horizontal directions can be suppressed. Further, by sandwiching the horizontal leg portions 44R, 44L from both sides with the position correcting mechanisms 20R, 20L, the flying vehicle 34 that has landed on the takeoff/landing surface 12a at a slant with respect to the edge part 12b can be turned to face the edge part 12b. In this way, by the position correcting mechanisms 20R, 20L, the position and orientation of the flying vehicle 34 that has landed on the takeoff/landing surface 12a can be corrected.

Further, by gripping and holding down the supporting leg portion 42R with the grip mechanism 22R and gripping and holding down the supporting leg portion 42L with the grip mechanism 22L, vertical vibration of the flying vehicle can be suppressed.

By having the contacts formed inside the insertion holes 14e, the battery of the flying vehicle 34 can be charged while the flying vehicle 34 is in a state of being secured by the securing device 14. For example, electric power is supplied to the flying vehicle 34 from a power feed device provided in the securing device 14, and the battery of the flying vehicle 34 is charged. Since electric power can be supplied to the flying vehicle 34 in this manner via the securing device 14, there is no need to reserve a space for power feed at a site other than at the securing device 14. Accordingly, space on the stage 12 can be effectively utilized.

Further, since the securing device 14 is provided at the edge part 12b, the area of the takeoff/landing surface 12a is increased as compared to cases where the securing device 14 is provided at the center of the takeoff/landing surface 12a. For this reason, the securing device 14 does not cause an obstruction when the flying vehicle 34 lands on the takeoff/landing surface 12a, and the flying vehicle 34 can land stably on the takeoff/landing surface 12a. For example, tip-over and the like of the flying vehicle 34 at the time of landing can be prevented.

While the flying vehicle 34 is secured by the securing device 14, work operations such as cargo handling, replacement of parts of the flying vehicle 34, and charging of the battery of the flying vehicle 34 may be carried out. Since the flying vehicle 34 is secured by the securing device 14, even when a load is applied to the flying vehicle 34 due to such work operations, position shift of the flying vehicle 34 can be prevented, and the work operations can be performed while stabilizing the attitude of the flying vehicle 34.

Figure 23:
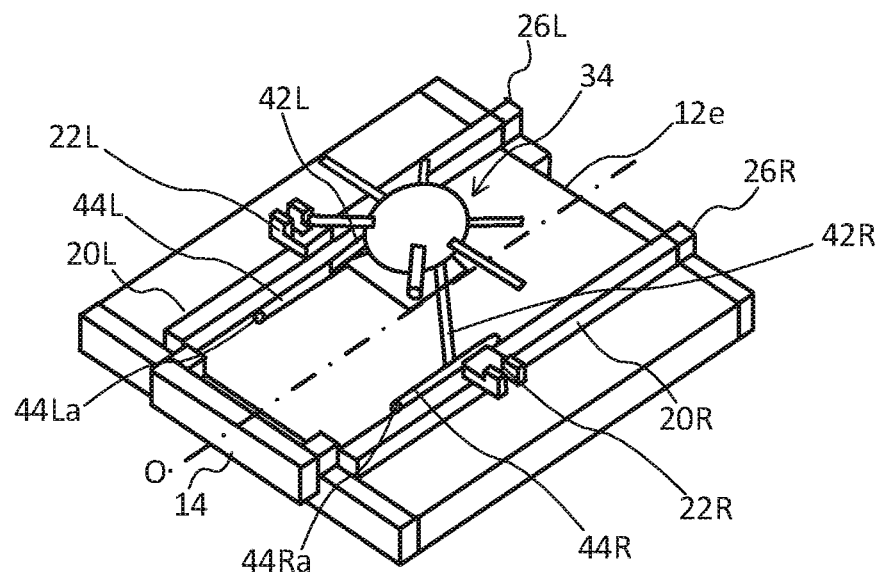
FIG. 23 is a perspective view showing the flying vehicle and the takeoff/landing assist device at the time of takeoff.
Figure 24:
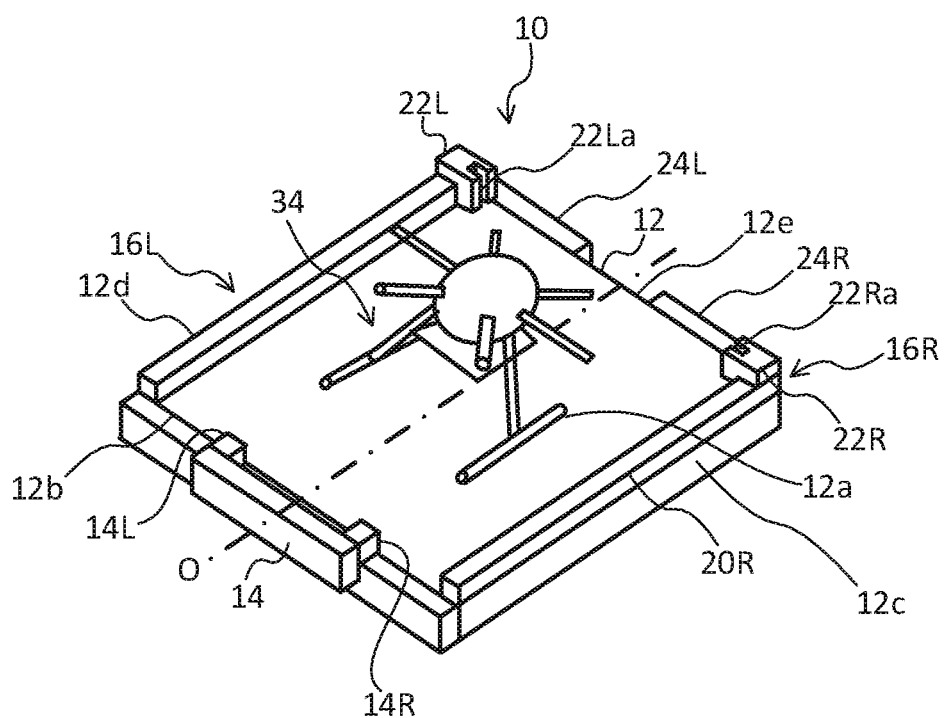
FIG. 24 is a perspective view showing the flying vehicle and the takeoff/landing assist device at the time of takeoff.

Operations of the takeoff/landing assist device 10 when the flying vehicle 34 takes off from the stage 12 will now be described by reference to FIGS. 19, 20, 23, and 24. FIGS. 23 and 24 are perspective views showing the takeoff/landing assist device 10 and the flying vehicle 34.

When the flying vehicle 34 is to take off from the stage 12, while the grip mechanism 22R is gripping the supporting leg portion 42R and the grip mechanism 22L is gripping the supporting leg portion 42L, the control device 18 moves the grip mechanisms 22R, 22L from the edge part 12b toward the edge part 12e using the electric actuators 28R, 28L. For example, as shown in FIGS. 19 and 20, the control device 18 moves the flying vehicle 34 to or near the center of the takeoff/landing surface 12a. The center of the takeoff/landing surface 12a is the midpoint between the edge parts 12b and 12e and also the midpoint between the edge parts 12c and 12d.

Next, as shown in FIG. 23, the control device 18 rotates the grip mechanism 22R around the pivot shaft 32R in the direction opposite to the centerline O side, and thereby releases the grip of the grip mechanism 22R on the supporting leg portion 42R. Similarly, the control device 18 rotates the grip mechanism 22L around the pivot shaft 32L in the direction opposite to the centerline O side, and thereby releases the grip of the grip mechanism 22L on the supporting leg portion 42L.

Next, as shown in FIG. 24, the control device 18 moves the position correcting mechanism 20R toward the edge part 12c using the electric actuator 24R, and moves the position correcting mechanism 20L toward the edge part 12d using the electric actuator 24L. As a result, the support provided to the horizontal leg portions 44R, 44L by the position correcting mechanisms 20R, 20L is released. In that state, the flying vehicle 34 takes off from the takeoff/landing surface 12a.

When allowing the flying vehicle 34 to take off, by moving the flying vehicle 34 to or near the center of the takeoff/landing surface 12a, it is possible to allow the flying vehicle 34 to take off in a state in which sufficient distance from the surroundings of the takeoff/landing assist device 10 is ensured. For example, it is possible to reduce the influence of wind at the time of takeoff and reduce the likelihood of the flying vehicle 34 coming into contact with objects in the environs of the takeoff/landing assist device 10 immediately after takeoff. Accordingly, safer takeoff can be achieved.

Figure 25:
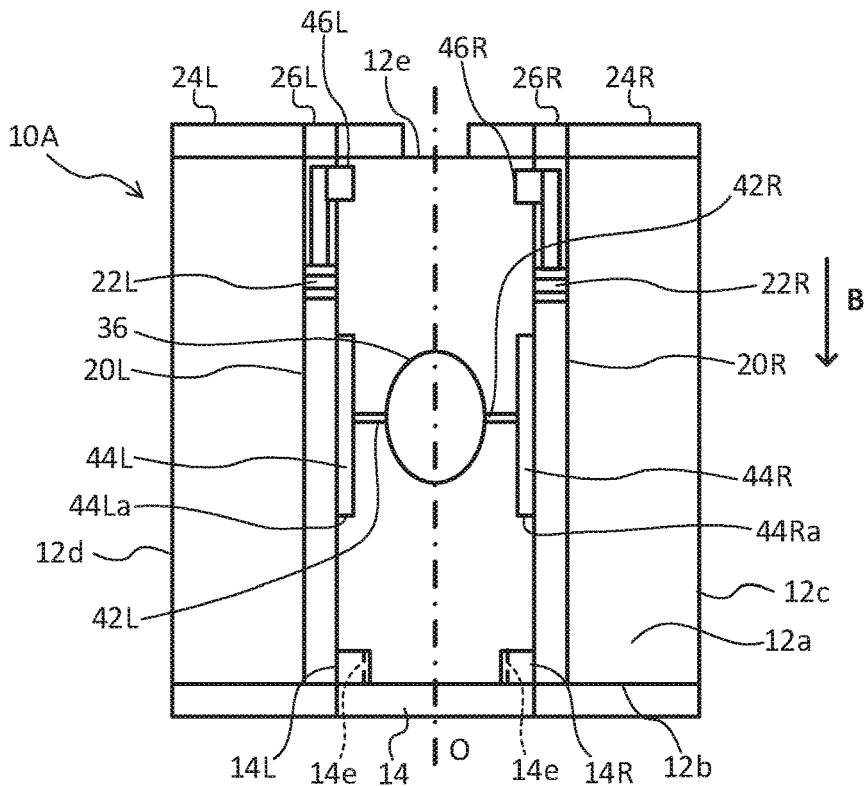
FIG. 25 is a plan view, seen from above, of a takeoff/landing assist device according to a variant embodiment.
Figure 26:
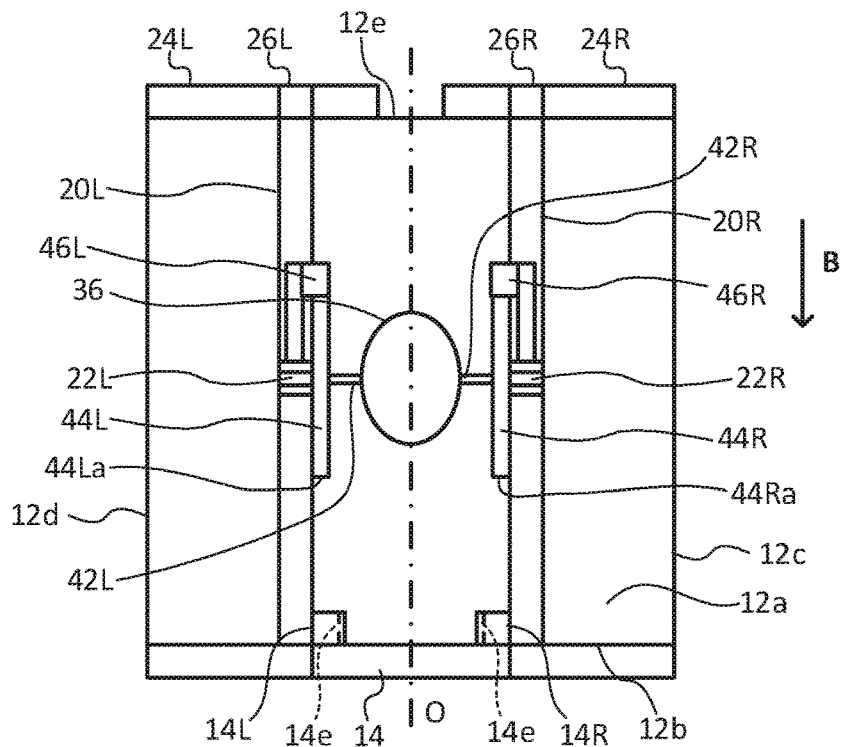
FIG. 26 is a plan view, seen from above, of the takeoff/landing assist device according to the variant embodiment.
Figure 27:
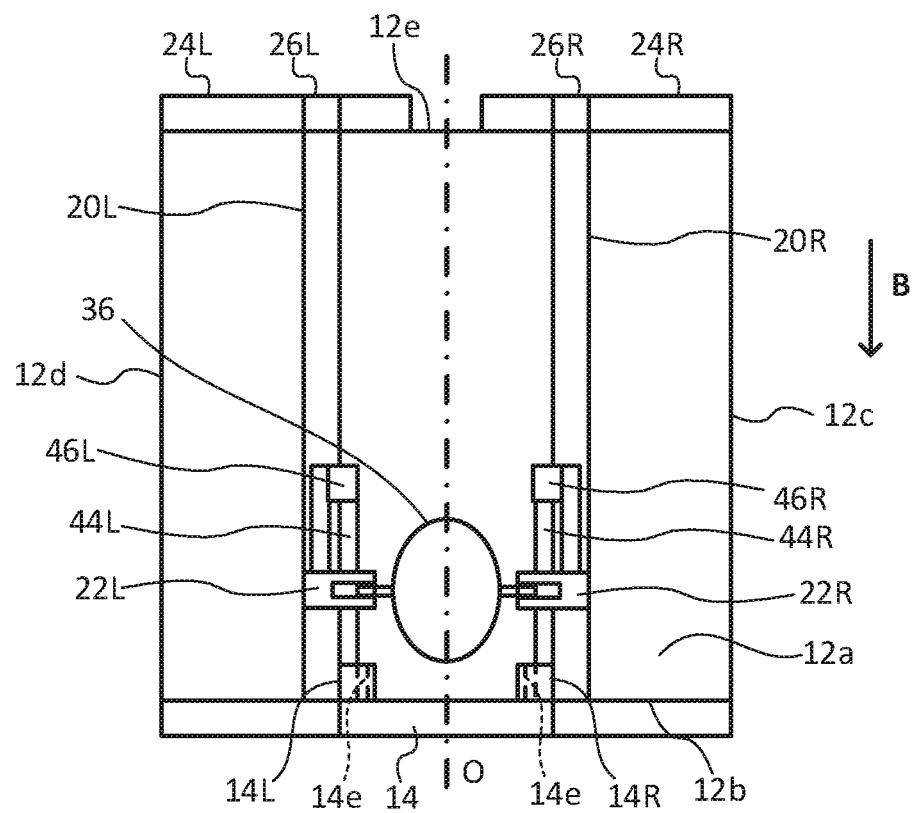
FIG. 27 is a plan view, seen from above, of the takeoff/landing assist device according to the variant embodiment.

A takeoff/landing assist device 10A according to a variant embodiment will now be described by reference to FIGS. 25 to 27. FIGS. 25 to 27 are plan views, seen from above, of the takeoff/landing assist device 10A and the flying vehicle 34. In FIGS. 25 to 27, the propellers 38 are not shown for convenience of explanation. In the examples shown in FIGS. 25 and 26, the flying vehicle 34 has been moved to a position along the centerline O by the position correcting mechanisms 20R, 20L.

The takeoff/landing assist device 10A further includes pushing members 46R and 46L in addition to the structures of the takeoff/landing assist device 10.

The pushing member 46R is provided on the surface, on the centerline O side, of the position correcting mechanism 20R (namely, the surface facing the edge part 12*d*) at a position toward the edge part 12*e* from the position of the grip mechanism 22R. Further, the pushing member 46R is located at a position corresponding to the height of the horizontal leg portion 44R from the takeoff/landing surface 12*a*. The pushing member 46R is coupled to the slider 30R of the electric actuator 28R.

The pushing member 46L is provided on the surface, on the centerline O side, of the position correcting mechanism 20L (namely, the surface facing the edge part 12*c*) at a position toward the edge part 12*e* from the position of the grip mechanism 22L. Further, the pushing member 46L is located at a position corresponding to the height of the horizontal leg portion 44L from the takeoff/landing surface 12*a*. The pushing member 46L is coupled to the slider 30L of the electric actuator 28L.

When moving the flying vehicle 34 to the securing device 14, as shown in FIG. 26, the control device 18 moves the grip mechanisms 22R, 22L and the pushing members 46R, 46L toward the edge part 12*b* (see arrow B). As a result, the pushing member 46R comes into contact with an end portion of the horizontal leg portion 44R (i.e., the end portion opposite to the end portion 44Ra), and the pushing member 46L comes into contact with an end portion of the horizontal leg portion 44L (i.e., the end portion opposite to the end portion 44La). When the grip mechanisms 22R, 22L and the pushing members 46R, 46L are moved further toward the edge part 12*b*, the pushing member 46R pushes the horizontal leg portion 44R toward the edge part 12*b*, and the pushing member 46L pushes the horizontal leg portion 44L toward the edge part 12*b*. As a result of the horizontal leg portions 44R, 44L being pushed toward the edge part 12*b* by the pushing member 46R, 46L, the flying vehicle 34 is moved toward the edge part 12*b*.

Here, the positional relationship between the grip mechanism 22R and the pushing member 46R is adjusted such that, when the pushing member 46R is in a state of being in contact with the end portion of the horizontal leg portion 44R (i.e., the end portion opposite to the end portion 44Ra), the groove 22Ra of the grip mechanism 22R is located at a position corresponding to the supporting leg portion 42R. Similarly, the positional relationship between the grip mechanism 22L and the pushing member 46L is adjusted such that, when the pushing member 46L is in a state of being in contact with the end portion of the horizontal leg portion 44L (i.e., the end portion opposite to the end portion 44La), the groove 22La of the grip mechanism 22L is located at a position corresponding to the supporting leg portion 42L.

As shown in FIG. 27, the control device 18 moves the grip mechanisms 22R, 22L and the pushing members 46R, 46L toward the edge part 12*b* until the end portion 44Ra of the horizontal leg portion 44R is inserted into the insertion hole 14*e* of the insertion part 14R and the end portion 44La of the horizontal leg portion 44L is inserted into the insertion hole 14*e* of the insertion part 14L.

When the end portion 44Ra is inserted into the insertion hole 14*e* of the insertion part 14R and the end portion 44La is inserted into the insertion hole 14*e* of the insertion part 14L, the control device 18 rotates the grip mechanism 22R toward the supporting leg portion 42R using the electric actuator 42R, and rotates the grip mechanism 22L toward the supporting leg portion 42L using the electric actuator 42L. As a result, the supporting leg portion 42R is hooked in the groove 22Ra of the grip mechanism 22R and gripped by the grip mechanism 22R. The supporting leg portion 42L is hooked in the groove 22La of the grip mechanism 22L and gripped by the grip mechanism 22L.

In this way, the flying vehicle 34 is secured by the securing device 14 and gripped by the grip mechanisms 22R, 22L. In the present variant embodiment, as with the above-described embodiment, the flying vehicle 34 is secured on the stage 12 by the securing device 14, and vertical vibration is suppressed by the grip mechanisms 22R, 22L.

It is noted that during when the flying vehicle 34 is being moved toward the edge part 12*b*, the supporting leg portion 42R may be gripped by the grip mechanism 22R and the supporting leg portion 42L may be gripped by the grip mechanism 22L. For example, the supporting leg portion 42R may be gripped by the grip mechanism 22R at the point when the pushing member 46R comes into contact with the end portion of the horizontal leg portion 44R, and the supporting leg portion 42L may be gripped by the grip mechanism 22L at the point when the pushing member 46L comes into contact with the end portion of the horizontal leg portion 44L.

In the stage 12, an opening part for cargo handling may be formed. This feature will now be described by reference to FIGS. 28 to 31. FIGS. 28 to 31 are perspective views showing a takeoff/landing assist device 10B and a flying vehicle 34.

Figure 28:
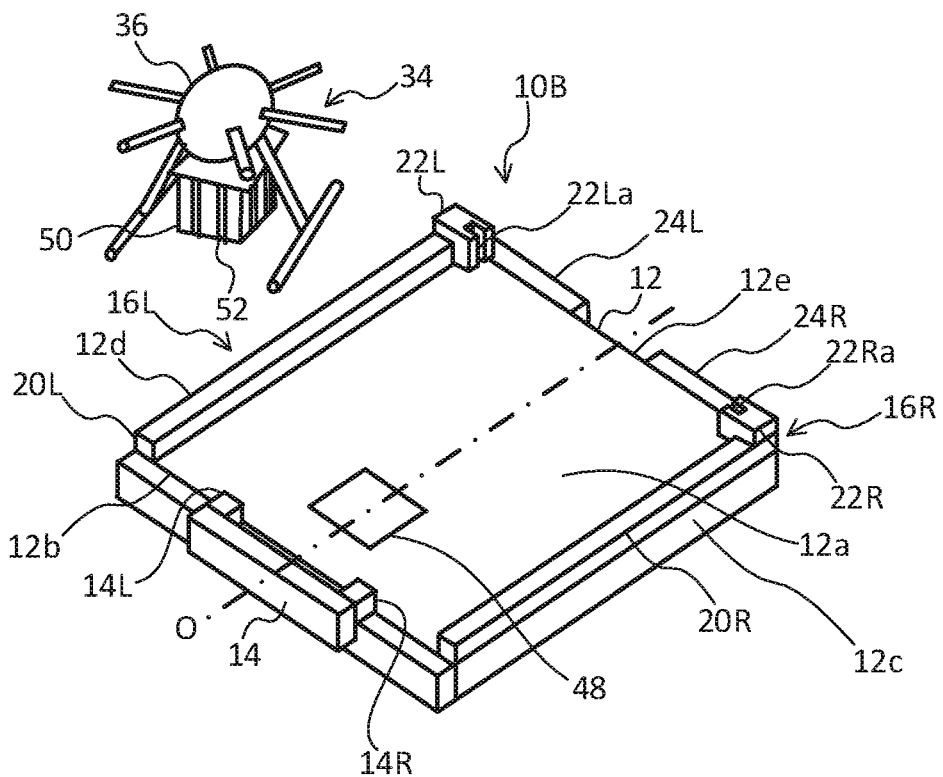
FIG. 28 is a perspective view showing a takeoff/landing assist device having an opening part formed therein, and a flying vehicle.

As shown in FIG. 28, the takeoff/landing assist device 10B includes an opening part 48 for cargo handling in addition to the structures of the takeoff/landing assist device 10. The opening part 48 is provided at a position corresponding to the flying vehicle 34 secured by the securing device 14. Cargo 50 loaded on the flying vehicle 34 is delivered into the takeoff/landing assist device 10B via the opening part 48. Further, cargo 50 is loaded onto the flying vehicle 34 via the opening part 48. A cover that can be opened and closed is provided at the opening part 48. The cover is opened when cargo handling is to be performed, and is closed at other times. Opening and closing operations of the cover are performed using, for example, a motor or the like under the control of the control device 18.

The flying vehicle 34 further includes a grip mechanism 52. The grip mechanism 52 is provided at a lower part of the vehicle body 36, and serves to sandwich and grip cargo 50. The flying vehicle 34 transports cargo 50 while in a state of gripping the cargo 50 with the grip mechanism 52.

Figure 29:
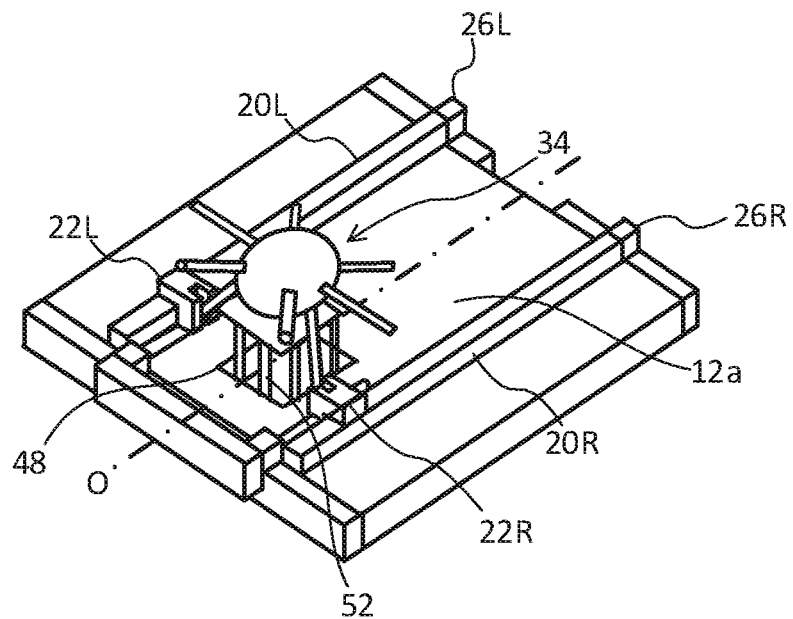
FIG. 29 is a perspective view showing a state in which the flying vehicle is performing a work operation at the opening part of the takeoff/landing assist device.

As with the above-described embodiment, when the flying vehicle 34 has landed on the takeoff/landing surface 12*a*, the flying vehicle 34 is moved by the moving mechanisms 16R, 16L to the securing device 14 and is secured by the securing device 14 as shown in FIG. 29. In that state, when the grip mechanism 52 releases the grip on the cargo 50, the cargo 50 is delivered into the takeoff/landing assist device 10B via the opening part 48.

Figure 30:
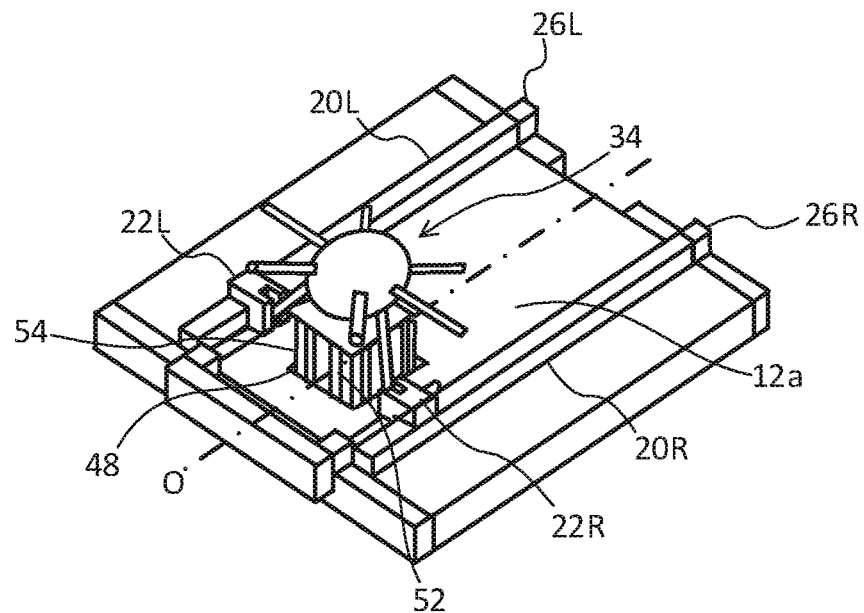
FIG. 30 is a perspective view showing a state in which the flying vehicle is performing a work operation at the opening part of the takeoff/landing assist device.

Further, when new cargo 54 is to be transported by the flying vehicle 34, as shown in FIG. 30, the cargo 54 is delivered to the grip mechanism 52 via the opening part 48, and the grip mechanism 52 grips the cargo 54.

Figure 31:
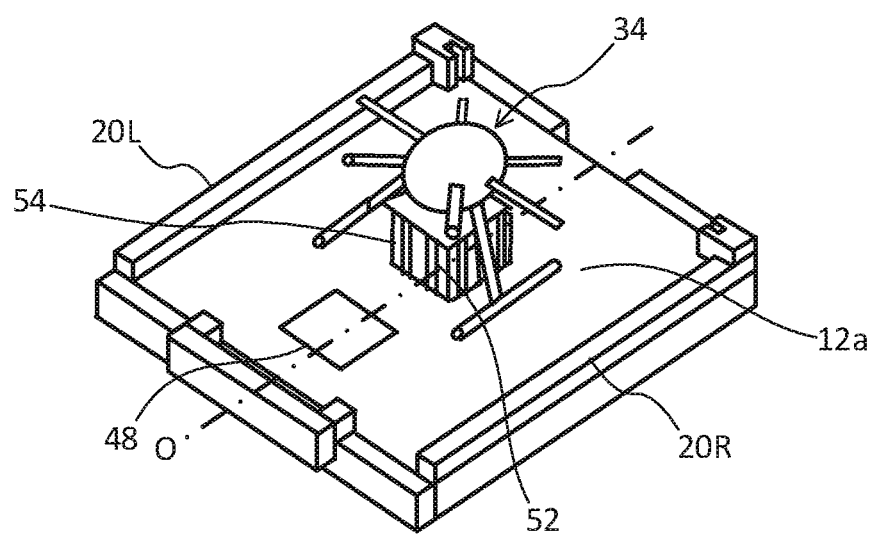
FIG. 31 is a perspective view showing the flying vehicle and the takeoff/landing assist device at the time of takeoff.

Next, for takeoff, the moving mechanisms 16R, 16L move the flying vehicle 34 to or near the center of the takeoff/landing surface 12*a* as shown in FIG. 31. The flying vehicle 34 takes off from there and flies to a destination.

Since the flying vehicle 34 is secured by the securing device 14, even when a load is applied to the flying vehicle 34 during cargo handling, position shift of the flying vehicle 34 can be prevented, and cargo handling operations can be performed while stabilizing the attitude of the flying vehicle 34.

Via the opening part 48, replacement of parts of the flying vehicle 34 may be carried out. In that case also, since the flying vehicle 34 is secured by the securing device 14, even when a load is applied to the flying vehicle 34 during parts replacement, position shift of the flying vehicle 34 can be prevented, and parts can be replaced while stabilizing the attitude of the flying vehicle 34.

Further, in the takeoff/landing assist device 10B, as in other embodiments described above, the battery of the flying vehicle 34 may be charged via the insertion holes 14e.

The takeoff/landing assist devices 10, 10A, 10B may be installed on objects or sites which are not envisioned to be moved, such as the ground, a road, and a building, or may be installed on objects or sites which are envisioned to be moved, such as a vehicle (for example, an automobile, railroad car, etc.) and a ship.

Figure 32:
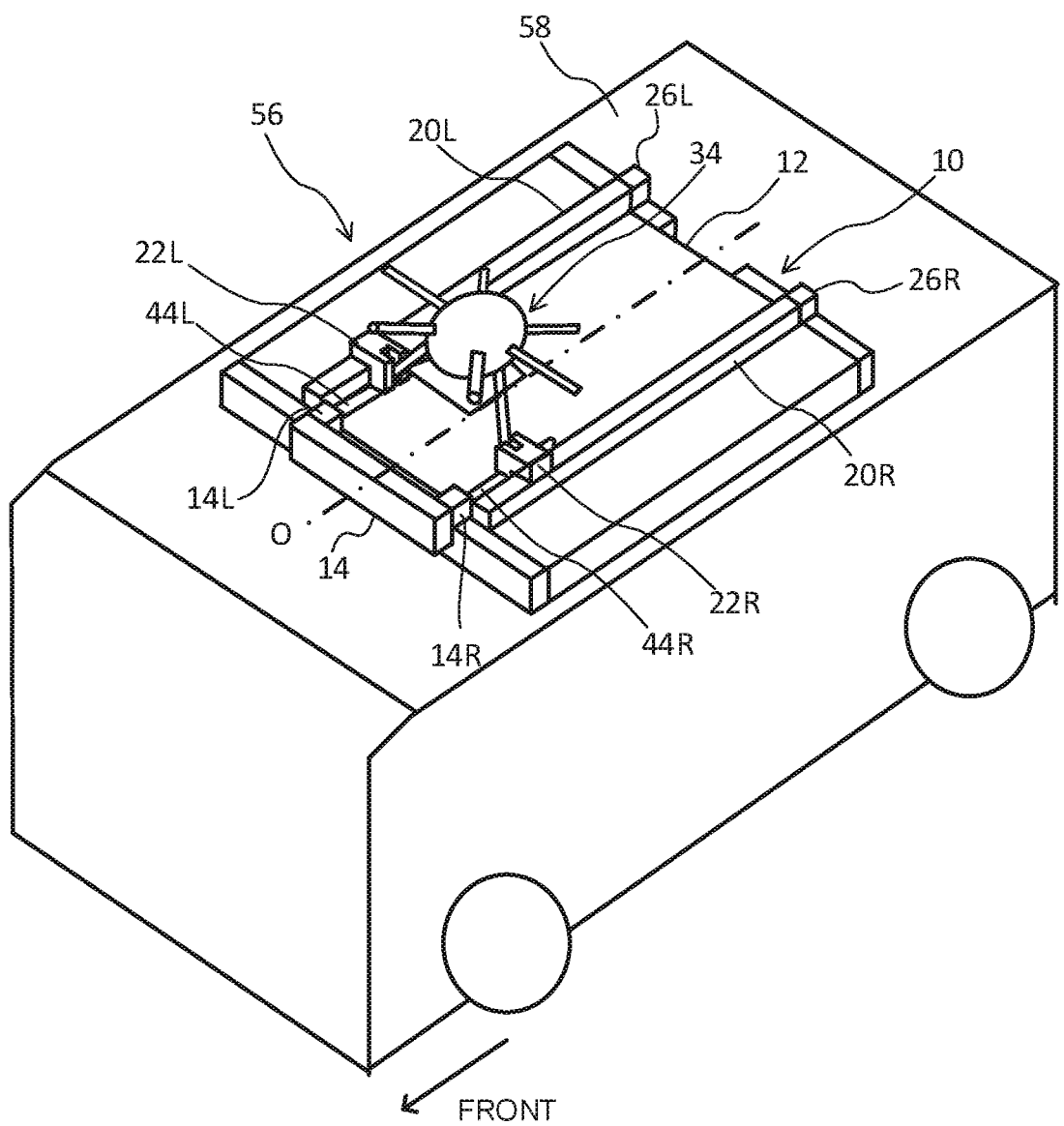
FIG. 32 is a perspective view showing the takeoff/landing assist device installed on an automobile.

Here, as one example, a case where the takeoff/landing assist device 10 is installed on an automobile, which is an example vehicle, is described by reference to FIG. 32. FIG. 32 is a perspective view showing the takeoff/landing assist device 10 and the automobile 56.

The takeoff/landing assist device 10 is installed on the roof 58 of the automobile 56. The flying vehicle 34 lands on and takes off from the takeoff/landing assist device 10 while the automobile 56 is moving or is in a stopped state.

In the example shown in FIG. 32, the takeoff/landing assist device 10 is installed on the roof 58 such that the edge part 12b at which the securing device 14 is provided faces the front of the automobile 56, but this manner of installation is simply one example. The takeoff/landing assist device 10 may be installed such that the edge part 12b at which the securing device 14 is provided faces the rear of the automobile 56. In a further example, the takeoff/landing assist device 10 may be installed such that the edge part 12b at which the securing device 14 is provided faces the right or left of the automobile 56.

In cases where the takeoff/landing assist device 10 is used as a vehicle-mounted takeoff/landing assist device as described above, vibrations and the like generated during travel may possibly influence the level of securing of the flying vehicle 34. Examples of the vibrations include longitudinal vibrations that occur during acceleration and deceleration of the automobile 56, vertical vibrations that occur due to unevenness in the road surface, and lateral vibrations that occur due to steering of the automobile 56.

According to the takeoff/landing assist device 10, by securing the flying vehicle 34 using the securing device 14, even during when the automobile 56 is traveling, the influence of the vibrations can be alleviated, and the flying vehicle 34 can be secured while suppressing positional shifts of the flying vehicle 34 on the takeoff/landing surface 12a. By sandwiching the horizontal leg portions 44R, 44L from both sides with the position correcting mechanisms 20R, 20L, the influence of the lateral vibrations of the automobile 56 can be alleviated, and position shift of the flying vehicle 34 in the lateral directions can be suppressed. Further, by gripping the supporting leg portion 42R with the grip mechanism 22R and gripping the supporting leg portion 42L with the grip mechanism 22L, the influence of the vertical and longitudinal vibrations of the automobile 56 can be alleviated, and position shift of the flying vehicle 34 in the vertical and longitudinal directions can be suppressed.

As such, even when the takeoff/landing assist device 10 is installed on the automobile 56, the flying vehicle 34 can be secured on the takeoff/landing surface 12a while alleviating vibrations and the like during travel. For example, it is possible to prevent the flying vehicle 34 from tipping over on or falling off from the stage 12. In a case where the takeoff/landing assist device 10A or 10B is installed on the automobile 56, the flying vehicle 34 can be similarly secured on the takeoff/landing surface 12a.

In a case where the takeoff/landing assist device 10, 10A, or 10B is installed on a movable entity such as a railroad car or a ship, the flying vehicle 34 can be similarly secured on the takeoff/landing surface 12a while alleviating vibrations and the like generated during movement of the movable entity.

The invention claimed is:

1. A takeoff/landing assist device, comprising:
   a stage on which a flying vehicle is to perform takeoff and landing;
   a securing device provided at an edge part of the stage and configured to secure the flying vehicle on the stage; and
   a moving mechanism configured to move the flying vehicle, which has landed on the stage at an inward part located inward from the edge part, from the inward part to the securing device, wherein:
   the securing device secures the flying vehicle that has been moved by the moving mechanism to the securing device,
   an insertion hole is formed in the securing device,
   a leg of the flying vehicle is inserted into the insertion hole,
   the securing device secures the flying vehicle on the stage by having the leg inserted in the insertion hole, and
   the moving mechanism inserts the leg into the insertion hole by moving the flying vehicle, which has landed on the stage at the inward part located inward from the edge part, from the inward part to the securing device.

2. The takeoff/landing assist device according to claim 1, wherein
   a contact that is electrically connectable to the leg inserted in the insertion hole is provided inside the insertion hole.

3. The takeoff/landing assist device according to claim 2, wherein
   the insertion hole is formed at two locations in the securing device,
   a positive contact is provided inside the insertion hole formed at one of the two locations, and
   a negative contact is provided inside the insertion hole formed at the other of the two locations.

4. The takeoff/landing assist device according to claim 1, further comprising
   a lid for closing an opening of the insertion hole, wherein
   the lid opens the opening when the leg is inserted into the insertion hole, and closes the opening when the leg is not inserted in the insertion hole.

5. The takeoff/landing assist device according to claim 2, further comprising
   a lid for closing an opening of the insertion hole, wherein
   the lid opens the opening when the leg is inserted into the insertion hole, and closes the opening when the leg is not inserted in the insertion hole.

6. The takeoff/landing assist device according to claim 3, further comprising
   a lid for closing an opening of the insertion hole, wherein
   the lid opens the opening when the leg is inserted into the insertion hole, and closes the opening when the leg is not inserted in the insertion hole.

7. The takeoff/landing assist device according to claim 1, wherein
   the moving mechanism comprises a grip mechanism for gripping a leg of the flying vehicle, and the grip mechanism grips the leg when the leg is secured by the securing device.

8. The takeoff/landing assist device according to claim 1, wherein
the moving mechanism comprises a grip mechanism for gripping the leg, and
the grip mechanism grips the leg when the leg is secured by the securing device.

9. The takeoff/landing assist device according to claim 2, wherein
the moving mechanism comprises a grip mechanism for gripping the leg, and
the grip mechanism grips the leg when the leg is secured by the securing device.

10. The takeoff/landing assist device according to claim 3, wherein
the moving mechanism comprises a grip mechanism for gripping the leg, and
the grip mechanism grips the leg when the leg is secured by the securing device.

11. The takeoff/landing assist device according to claim 4, wherein
the moving mechanism comprises a grip mechanism for gripping the leg, and
the grip mechanism grips the leg when the leg is secured by the securing device.

12. The takeoff/landing assist device according to claim 7, wherein
the grip mechanism additionally grips the leg when the moving mechanism is moving the flying vehicle to the securing device.

13. The takeoff/landing assist device according to claim 1, wherein
at a time of takeoff of the flying vehicle, before the flying vehicle takes off, the moving mechanism moves the flying vehicle on the stage to the inward part located inward from the edge part.

14. The takeoff/landing assist device according to claim 1, wherein
at a time of takeoff of the flying vehicle, before the flying vehicle takes off, the moving mechanism moves the flying vehicle on the stage to the inward part located inward from the edge part.

15. The takeoff/landing assist device according to claim 2, wherein
at a time of takeoff of the flying vehicle, before the flying vehicle takes off, the moving mechanism moves the flying vehicle on the stage to the inward part located inward from the edge part.

16. The takeoff/landing assist device according to claim 3, wherein
at a time of takeoff of the flying vehicle, before the flying vehicle takes off, the moving mechanism moves the flying vehicle on the stage to the inward part located inward from the edge part.

17. The takeoff/landing assist device according to claim 4, wherein
at a time of takeoff of the flying vehicle, before the flying vehicle takes off, the moving mechanism moves the flying vehicle on the stage to the inward part located inward from the edge part.

18. The takeoff/landing assist device according to claim 5, wherein
at a time of takeoff of the flying vehicle, before the flying vehicle takes off, the moving mechanism moves the flying vehicle on the stage to the inward part located inward from the edge part.

19. The takeoff/landing assist device according to claim 1, wherein
the stage, the securing device, and the moving mechanism are installed on a roof of a vehicle.

* * * * *